United States Patent
Xu et al.

(10) Patent No.: US 11,368,746 B2
(45) Date of Patent: Jun. 21, 2022

(54) METHOD AND DEVICE FOR GENERATING SPECIAL EFFECT PROGRAM FILE PACKAGE, METHOD AND DEVICE FOR GENERATING SPECIAL EFFECT, AND ELECTRONIC DEVICE

(71) Applicant: BEIJING SENSETIME TECHNOLOGY DEVELOPMENT CO., LTD., Beijing (CN)

(72) Inventors: Qinqin Xu, Beijing (CN); Zhanpeng Li, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 85 days.

(21) Appl. No.: 16/914,622

(22) Filed: Jun. 29, 2020

(65) Prior Publication Data
US 2020/0329272 A1    Oct. 15, 2020

Related U.S. Application Data

(63) Continuation of application No. PCT/CN2019/074503, filed on Feb. 1, 2019.

(30) Foreign Application Priority Data

Feb. 8, 2018    (CN) .......................... 201810129969.7

(51) Int. Cl.
*G11B 27/02*  (2006.01)
*H04N 21/435*  (2011.01)

(52) U.S. Cl.
CPC ......... *H04N 21/4351* (2013.01); *G11B 27/02* (2013.01)

(58) Field of Classification Search
CPC ............... G06T 3/0093; G06T 2200/24; G06F 3/04847
See application file for complete search history.

(56) References Cited

U.S. PATENT DOCUMENTS 6,469,723 B1    10/2002  Gould
9,811,894 B2    11/2017  Yu et al.
(Continued)

FOREIGN PATENT DOCUMENTS

CN    1564202 A    1/2005
CN    102567031 A    7/2012
(Continued)

OTHER PUBLICATIONS

First Written Opinion of the Singaporean application No. 11202006351V, dated Jul. 20, 2021, 8 pgs.
(Continued)

*Primary Examiner* — Thai Q Tran
*Assistant Examiner* — Jose M Mesa
(74) *Attorney, Agent, or Firm* — Cooper Legal Group, LLC

(57) ABSTRACT

A method for generating a special effect program file package includes: importing a group of sub-materials, where the group of sub-materials include a plurality of sub-materials; obtaining parameter values of playback parameters of the group of sub-materials; and generating a special effect program file package according to the group of sub-materials and the parameter values of the playback parameters.

25 Claims, 13 Drawing Sheets

(56) References Cited

U.S. PATENT DOCUMENTS

| | | | |
|---|---|---|---|
| 2002/0112180 A1* | 8/2002 | Land | G11B 27/034 726/26 |
| 2005/0135675 A1* | 6/2005 | Chen | G06T 11/00 382/162 |
| 2006/0008247 A1 | 1/2006 | Minami | |
| 2007/0153091 A1 | 7/2007 | Watlington | |
| 2011/0289455 A1* | 11/2011 | Reville | G06F 3/011 715/830 |
| 2013/0230259 A1 | 9/2013 | Intwala | |
| 2014/0043321 A1 | 2/2014 | Matjasko | |
| 2014/0196152 A1 | 7/2014 | Ur | |
| 2015/0220789 A1* | 8/2015 | Wood | G06T 7/246 382/103 |
| 2015/0271438 A1 | 9/2015 | Gandolph et al. | |
| 2016/0260204 A1 | 9/2016 | Yu et al. | |
| 2018/0137382 A1 | 5/2018 | Nowak et al. | |
| 2019/0122329 A1* | 4/2019 | Wang | G06K 9/66 |
| 2019/0236547 A1* | 8/2019 | Huang | H04L 65/4015 |
| 2020/0329272 A1 | 10/2020 | Xu et al. | |

FOREIGN PATENT DOCUMENTS

| | | |
|---|---|---|
| CN | 102760303 A | 10/2012 |
| CN | 102801924 A | 11/2012 |
| CN | 102984465 A | 3/2013 |
| CN | 103928039 A | 7/2014 |
| CN | 104394331 A | 3/2015 |
| CN | 104469179 A | 3/2015 |
| CN | 104637078 A | 5/2015 |
| CN | 104778712 A | 7/2015 |
| CN | 104967893 A | 10/2015 |
| CN | 105451090 A | 3/2016 |
| CN | 105975935 A | 9/2016 |
| CN | 106097417 A | 11/2016 |
| CN | 106101576 A | 11/2016 |
| CN | 106231205 A | 12/2016 |
| CN | 106296781 A | 1/2017 |
| CN | 106341720 A | 1/2017 |
| CN | 106373170 A | 2/2017 |
| CN | 104469179 B | 8/2017 |
| CN | 107341435 A | 11/2017 |
| CN | 104778712 B | 5/2018 |
| CN | 106097417 B | 7/2018 |
| CN | 108259496 A | 7/2018 |
| CN | 108388434 A | 8/2018 |
| CN | 106101576 B | 7/2019 |
| JP | H1118005 A | 1/1999 |
| JP | 2000083195 A | 3/2000 |
| JP | 2001307123 A | 11/2001 |
| JP | 2003092706 A | 3/2003 |
| JP | 2004171184 A | 6/2004 |
| JP | 2005242566 A | 9/2005 |
| JP | 2006260198 A | 9/2006 |
| JP | 2007087346 A | 4/2007 |
| JP | 2007156945 A | 6/2007 |
| JP | 2007257585 A | 10/2007 |
| JP | 2008536211 A | 9/2008 |
| JP | 2012113677 A | 6/2012 |
| JP | 2017010543 A | 1/2017 |
| KR | 20040018425 A | 3/2004 |
| KR | 20100069648 A | 6/2010 |
| WO | 2017190646 A1 | 11/2017 |

OTHER PUBLICATIONS

First Office Action of the Korean application No. 10-2020-7019275, dated Jul. 30, 2021, 6 pgs.

"Image Changer" Nov. 1997, Masami Nakagawa, Java, Software Design Software Design, Japan, Technical Knowledge, Inc., 7 pgs.

First Office Action of the Japanese application No. 2020-536227, dated Aug. 17, 2021, 30 pgs.

First Office Action of the Indian application No. 202027038304, dated Aug. 27, 2021, 6 pgs.

Supplementary European Search Report in the European application No. 19750743.7, dated Mar. 10, 2021.

"Final Cut Pro User's Manual", Feb. 2001, Apple Computer Inc. Internet Citation, XP002595986, Retrieved from the Internet: URL: http://www.arch.virginia.edu/ejm9k/arch545/handouts/FCP1.2UM. pdf, pp. 1-375.

International Search Report in the international application No. PCT/CN2019/074503, dated May 9, 2019, 2 pgs.

English translation of the Written Opinion of the International Search Authority in the international application No. PCT/CN2019/074503, dated May 9, 2019, 5 pgs.

First Office Action of the Chinese application No. 201810129969.7, dated Feb. 26, 2020, 35 pgs.

First Office Action of the U.S. Appl. No. 16/881,143, dated Feb. 11, 2022, 46 pgs.

First Office Action of the European application No. 19750743.7, dated Dec. 8, 2021, 6 pgs.

International Search Report in the international application No. PCT/CN2019/071094, dated Apr. 12, 2019, 3 pgs.

English translation of the Written Opinion of the International Search Authority in the international application No. PCT/CN2019/071094, dated Apr. 12, 2019, 5 pgs.

First Office Action of the Chinese application No. 201810055429.9, dated Oct. 25, 2019, 32 pgs.

Second Office Action of the Chinese application No. 201810055429.9, dated Jun. 1, 2020, 10 pgs.

First Office Action of the Japanese application No. 2020-528474, dated Jun. 25, 2021, 12 pgs.

First Office Action of the Korean application No. 10-2020-7016777, dated Aug. 15, 2021, 22 pgs.

Written Opinion of the Singaporean application No. 11202004849Y, dated May 31, 2021, 8 pgs.

* cited by examiner

METHOD AND DEVICE FOR GENERATING SPECIAL EFFECT PROGRAM FILE PACKAGE, METHOD AND DEVICE FOR GENERATING SPECIAL EFFECT, AND ELECTRONIC DEVICE

CROSS-REFERENCE TO RELATED APPLICATIONS

The present application is a continuation of International Application No. PCT/CN2019/074503, filed on Feb. 1, 2019, which claims priority to Chinese Patent Application No. 201810129969.7, filed on Feb. 8, 2018. The disclosures of International Application No. PCT/CN2019/074503 and Chinese Patent Application No. 201810129969.7 are hereby incorporated by reference in their entireties.

BACKGROUND

Augmented Reality (AR) is a new technology that integrates real-world information and virtual-world information "seamlessly". It simulates physical information that is originally in a certain time and space in the real world and then superimposes virtual information, applies the virtual information to the real world, and superimposes real-world persons, environments, and virtual objects to the same screen or space in real time, thereby achieving a sensory experience beyond reality.

SUMMARY

The present disclosure relates to the field of computer vision technologies, and in particular, to a method and apparatus for generating a special effect program file package, a method and apparatus for generating a special effect, and an electronic device.

Embodiments of the present disclosure provide technical solutions for generating a special effect program file package and technical solutions for generating a special effect.

A method for generating a special effect program file package provided according to one aspect of the embodiments of the present disclosure includes: importing a group of sub-materials, where the group of sub-materials include a plurality of sub-materials; obtaining parameter values of playback parameters of the group of sub-materials; and generating a special effect program file package according to the group of sub-materials and the parameter values of the playback parameters.

A method for generating a special effect provided according to another aspect of the embodiments of the present disclosure includes: obtaining reference values of playback parameters of at least one group of sub-materials in a special effect program file package, where the group of sub-materials include a plurality of sub-materials; and performing key-point detection on a video image; generating a special effect based on the at least one group of sub-materials on the video image according to detected key points and the reference values of the playback parameters of the at least one group of sub-materials.

An apparatus for generating a special effect program file package provided according to still another aspect of the embodiments of the present disclosure includes: a first import module, configured to import a group of sub-materials, where the group of sub-materials include a plurality of sub-materials; a first acquisition module, configured to obtain parameter values of playback parameters of the group of sub-materials; and a first generation module, configured to generate a special effect program file package according to the group of sub-materials and the parameter values of the playback parameters.

An apparatus for generating a special effect provided according to still another aspect of the embodiments of the present disclosure includes: a second acquisition module, configured to obtain reference values of playback parameters of at least one group of sub-materials in a special effect program file package, where the group of sub-materials include a plurality of sub-materials; a first detection module, configured to perform key-point detection on a video image; and a second generation module, configured to generate a special effect based on the at least one group of sub-materials on the video image according to detected key points and the reference values of the playback parameters of the at least one group of sub-materials.

An electronic device provided according to yet another aspect of the embodiments of the present disclosure includes: a memory storing processor-executable instructions; and a processor arranged to execute the stored processor-executable instructions to perform operations of: importing a group of sub-materials, wherein the group of sub-materials comprise a plurality of sub-materials, obtaining parameter values of playback parameters of the group of sub-materials, and generating the special effect program file package according to the group of sub-materials and the parameter values of the playback parameters; or, obtaining reference values of playback parameters of at least one group of sub-materials in a special effect program file package, wherein the group of sub-materials comprise a plurality of sub-materials, performing key-point detection on a video image, and generating a special effect based on the at least one group of sub-materials on the video image according to detected key points and the reference values of the playback parameters of the at least one group of sub-materials.

A non-transitory computer-readable storage medium provided according to yet another aspect of the embodiments of the present application has a computer program stored thereon, where when the computer program is executed by a processor, the method according to any one of the embodiments of the present application is implemented.

A computer program provided according to yet another aspect of the embodiments of the present disclosure includes computer instructions, where when the computer instructions run in a processor of a device, the method according to any one of the embodiments of the present disclosure is implemented.

The following further describes in detail the technical solutions of the present disclosure with reference to the accompanying drawings and embodiments.

BRIEF DESCRIPTION OF THE DRAWINGS

The accompanying drawings constituting a part of the specification describe embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION

Figure 1:
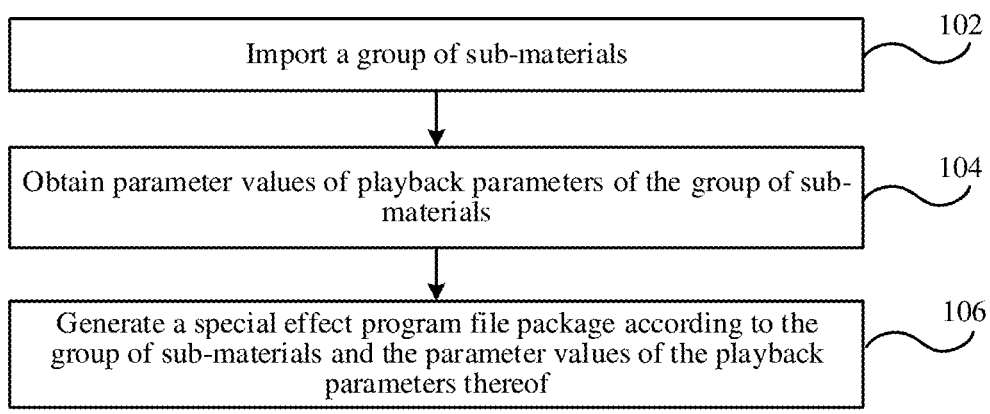
FIG. 1 is a flowchart of one embodiment of a method for generating a special effect program file package of the present disclosure.

Various exemplary embodiments of the present disclosure are now described in detail with reference to the accompanying drawings. It may be noted that, unless otherwise stated specifically, relative arrangement of the components and steps, the numerical expressions, and the values set forth in the embodiments are not intended to limit the scope of the present disclosure.

It should also be understood that, in the embodiments of the present invention, "a plurality of" may refer to two or more, and "at least one" may refer to one, two or more. A person skilled in the art may understand that the terms such as "first" and "second" in the embodiments of the present disclosure are only used to distinguish different steps, devices or modules, etc., and do not represent any specific technical meaning or an inevitable logical sequence therebetween.

It should also be understood that, for any component, data or structure mentioned in the embodiments of the present disclosure, if there is no explicit limitation or no opposite motivation is provided in context, it is generally understood that the number of the component, data or structure is one or more.

It should also be understood that, the descriptions of the embodiments in the present disclosure focus on differences between the embodiments, and for same or similar parts in the embodiments, refer to these embodiments. For the purpose of brevity, details are not described repeatedly.

In addition, it may be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices may be considered as a part of the specification in appropriate situations.

It may be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the disclosure merely describes an association relationship between associated objects, indicating that there may be three relationships, for example, A and/or B, which may indicate that A exists separately, both A and B exist, and B exists separately. In addition, the character "I" in the present disclosure generally represents that the sequential associated objects are in an "or" relationship.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (for example, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are executed by remote processing devices that are linked through a communications network. In the distributed computing environments, program modules may be located in local or remote computing system storage media including storage devices.

FIG. 1 is a flowchart of one embodiment of a method for generating a special effect program file package of the present disclosure. The method for generating a special effect program file package according to the embodiments of the present disclosure, for example, may be implemented by, but not limited to, an apparatus (referred to as an apparatus for generating a special effect program file package in the embodiments of the present disclosure). As shown in FIG. 1, the method for generating a special effect program file package according to this embodiment includes the following steps.

At 102, a group of sub-materials are imported.

In one implementation of the embodiments of the present disclosure, a plurality of sub-materials in the group of sub-materials have a predetermined playback time sequence. Exemplarily, the playback time sequence of the plurality of sub-materials in the group of sub-materials may be determined based on file names of the plurality of sub-materials.

In an optional example, the operation 102 may be performed by a processor by invoking a corresponding instruction stored in a memory, or may be performed by a first import module run by the processor.

At 104, parameter values of playback parameters of the group of sub-materials are obtained.

In an optional example, the operation 104 may be performed by a processor by invoking a corresponding instruction stored in a memory, or may be performed by a first acquisition module run by the processor.

At 106, a special effect program file package is generated according to the group of sub-materials and the parameter values of the playback parameters thereof.

In an optional example, the operation 106 may be performed by a processor by invoking a corresponding instruction stored in a memory, or may be performed by a first generation module run by the processor.

In the embodiments of the present disclosure, a group of sub-materials may be imported, or multiple groups of sub-materials may be imported. When the multiple groups of sub-materials are imported, the operations 102 and 104 may be performed on the groups of sub-materials respectively, then the operation 106 is performed on the groups of sub-materials, and a distortion special effect program file package is generated according to the multiple groups of sub-materials and parameter values of playback parameters thereof, i.e., the special effect program file package may include a group of sub-materials, or may include multiple groups of sub-materials.

In the embodiments of the present disclosure, the special effect program file package may be used for special effect processing of a video, and a dynamic special effect of a group of sub-materials is generated on the video. For example, rendering processing with an AR effect is performed on the video by an AR engine or an electronic device having an AR drawing function.

Based on the method for generating a special effect program file package provided in the foregoing embodiments of the present disclosure, during generation of a special effect program file package, a group of sub-materials are imported, where the group of sub-materials include a plurality of sub-materials, parameter values of playback parameters of the group of sub-materials are obtained, and a special effect program file package is generated according to the group of sub-materials and the parameter values of the playback parameters, so as to perform dynamic special effect processing on a video based on the special effect program file package, thereby achieving a dynamic special effect on a played video. According to the embodiments of the present disclosure, a special effect program file executable by a rendering engine may be generated, without manually writing a program file, and the operation is simple and requires less time, thereby improving the overall efficiency of achieving the dynamic special effect, and effectively guaranteeing the accuracy of the special effect.

In one implementation of the embodiments of the present disclosure, the apparatus for generating a special effect program file package may include a preset special effect program file, which may be, for example, a lightweight data interchange format (JavaScript Object Notation, json) file based on a JavaScript language or any other executable program file. Parameter values of playback parameters in the special effect program file may be null or preset as default values, and when parameter values set for playback parameters of a group of sub-materials are received, corresponding parameter values in the special effect program file are automatically updated into received parameter values.

Figure 2:
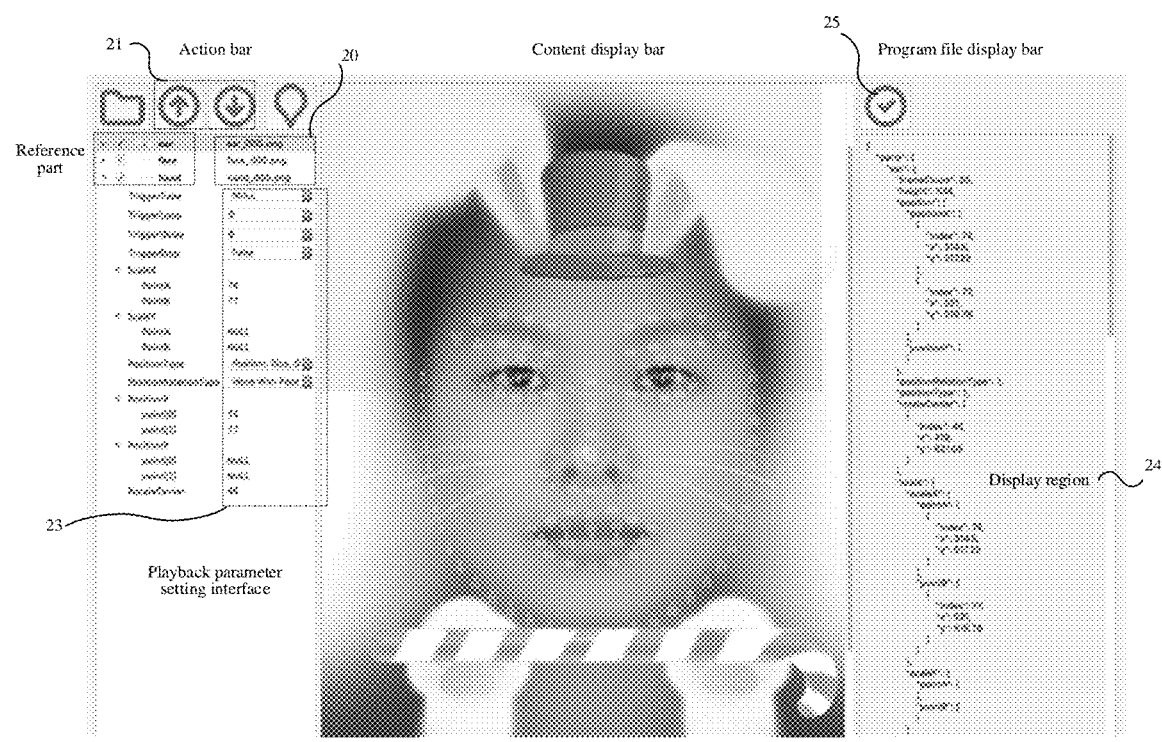
FIG. 2 is an operation interface exemplary diagram of an apparatus for generating a special effect program file package in embodiments of the present disclosure.

According to some embodiments, the foregoing apparatus for generating a special effect program file package may include an action bar, in which at least one interactive interface configured to receive the parameter values set for the playback parameters of the group of sub-materials is provided. In addition, the apparatus for generating a special effect program file package may further include a program file display bar configured to display a program file of the playback parameters of the group of sub-materials. FIG. 2 shows an operation interface exemplary diagram of an apparatus for generating a special effect program file package in embodiments of the present disclosure, and an operation interface of the apparatus for generating a special effect program file package includes an action bar and a program file display bar. After the apparatus for generating a special effect program file package is started, corresponding to a playback parameter setting interface of a group of sub-materials in the action bar, the program file display bar displays the special effect program file when playback parameters of the group of sub-materials are null or preset as default values, and when parameter values set for playback parameters of a group of sub-materials are received through an interactive interface of the action bar, the parameter values set for the playback parameters of the group of sub-materials are updated into recently received parameter values, and the program file display bar displays the special effect program file in real time after the parameter values are updated.

In one implementation of the embodiments of the method for generating a special effect program file package of the present disclosure, the operation 102 may include: receiving an import instruction sent through the interactive interface of the action bar, and importing, as the group of sub-materials, a plurality of sub-materials in a material folder pointed to by the import instruction.

Figure 3:
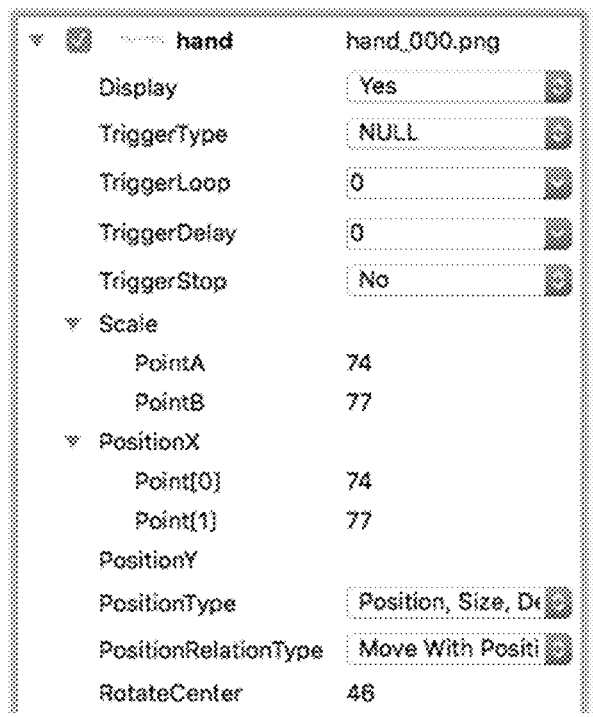
FIG. 3 is an exemplary schematic diagram of a playback parameter setting interface of sub-materials when a reference part is a hand in embodiments of the present disclosure.

As shown in FIG. 2, as one optional rather than limited example of the embodiments of the present disclosure, the action bar may include the playback parameter setting interface, which includes at least one interactive interface, and may further include other regions, such as a reference part display region; in this case, the playback parameter setting interface may be a playback parameter setting interface under each reference part. The reference part in the embodiments of the present disclosure, for example, may include, but may be not limited to, any one or more of the following: an ear, a hand, a face, hair, a neck, or a body. FIG. 3 shows an exemplary schematic diagram of a playback parameter setting interface of a group of sub-materials when a reference part is a hand in embodiments of the present disclosure.

In one optional example of the foregoing implementation of the present disclosure, receiving an import instruction input through an interactive interface of an action bar, and importing a plurality of sub-materials in a material folder pointed to by the import instruction may include: receiving the import instruction sent via the interactive interface in a playback parameter setting interface under the action bar, and importing the plurality of sub-materials in the material folder pointed to by the import instruction.

Alternatively, in another optional example of the foregoing implementation of the present disclosure, receiving the import instruction input through the interactive interface of the action bar, and importing the plurality of sub-materials in the material folder pointed to by the import instruction may include: receiving a selection instruction sent via the interactive interface of the action bar, using a reference part selected according to the selection instruction as a target part where a special effect currently needs to be added, and displaying a playback parameter setting interface for the target part in the action bar, receiving the import instruction sent via the interactive interface in the playback parameter setting interface, and importing the plurality of sub-materials in the material folder pointed to by the import instruction.

In still another optional example of the foregoing implementation of the present disclosure, receiving the import instruction input through the interactive interface of the action bar, and importing the plurality of sub-materials in the material folder pointed to by the import instruction may include:

receiving the import instruction sent via the interactive interface, and obtaining and displaying the material folder pointed to by the import instruction;

in response to receipt of a selection operation on the sub-materials in the material folder, importing a plurality of sub-materials selected according to the selection operation on the plurality of sub-materials; and/or in response to non-receipt of the selection operation on the sub-materials in the material folder, selecting all or some of the sub-materials in the material folder according to a presetting, and importing the sub-materials selected according to the presetting.

Each material folder may include a plurality of sub-materials. For example, if the target part is an ear, the material folder may include a plurality of sub-materials such as an earrings and earmuffs with different shapes and colors. In one implementation of the embodiments of the present disclosure, when a plurality of sub-materials are imported, if the selection operation on the sub-materials in the material folder by a user is not received, a plurality of sub-materials at a preset position or with preset serial numbers in the material folder pointed to by the import instruction may be imported according to the presetting. For example, when the user does not select sub-materials, first to fifth sub-materials in the material folder are selected and imported by default.

In one implementation of the embodiments of the present disclosure, in the operation 104, obtaining the parameter values of the playback parameters of the group of sub-materials may include: in response to receipt of the parameter values set for the playback parameters of the group of sub-materials sent via the interactive interface in the playback parameter setting interface, using the set parameter values as the parameter values of the playback parameters of the group of sub-materials; and/or in response to non-receipt of the parameter values set for the playback parameters of the group of sub-materials sent via the interactive interface in the playback parameter setting interface, using preset parameter values as the parameter values of the playback parameters of the group of sub-materials.

According to the embodiments of the present disclosure, a file executable by a rendering engine may be generated, without manually writing a program file, generation of a special effect program package may be implemented based on the selection operation on a group of sub-materials in the action bar and a setting operation on the parameter values, and the operation is simple and requires less time, thereby improving the overall efficiency of achieving the dynamic special effect, and effectively guaranteeing the accuracy of the special effect.

In one implementation of the embodiments of the present disclosure, after the parameter values of the playback parameters of a group of sub-materials are set, the parameter values may be applied to all the sub-materials in the group of sub-materials, i.e., the parameter values of the playback parameters of all the sub-materials in the group of sub-materials are the same. The playback parameters of the group of sub-materials, for example, may include, but may be not limited to, any one or more of the following:

1. a display parameter (Display), used for representing whether the plurality of sub-materials are displayed, where the parameter value thereof includes two operations, i.e., "Yes" and "No", when "Yes" is selected as the parameter value, it is indicated that during video playback, the corresponding plurality of sub-materials need to be displayed, and when "No" is selected as the parameter value, it is indicated that during the video playback, the plurality of sub-materials are not displayed;

2. an interval parameter, used for representing a number of frames spaced between two adjacent sub-materials in the plurality of sub-materials for display;

3. a trigger action parameter (TriggerType), used for representing a trigger action for triggering display of the plurality of sub-materials, referring to what action is used to trigger the display of the plurality of sub-materials, where a parameter value thereof may include trigger actions, and the user may select at least one action from a preset action set as the trigger action, that is, during the video playback, the corresponding plurality of sub-materials may be triggered when a corresponding trigger action is detected. For example, when it is detected that a trigger action "opening mount" specified in the trigger action parameter appears in the video, playback of an animation of throwing up rainbow formed of the plurality of sub-materials is started, and a display start time, a display stop time, a display duration, etc. of the plurality of sub-materials may be determined specifically according to parameter values of other parameters, and for example, may be determined respectively according to parameter values of a trigger delay parameter, a trigger stop parameter, and a loop parameter;

4. a loop parameter (TriggerLoop), used for representing a number of times of loop playback of the plurality of sub-materials, where a specific value of the number of times of the loop playback may be set or selected as a parameter value thereof, such as 1 and 5, and it may be appointed that infinite loop playback is performed when the reference value is set to be 0;

5. a trigger delay parameter (TriggerDelay), used for representing an amount of time for which a display of the plurality of sub-materials is delayed, i.e., when the trigger action in the trigger action parameter is detected from a certain frame in the video, the display of the plurality of sub-materials is started after how many frames elapse, and the amount of time for which the display of the plurality of sub-materials is delayed may be set or selected as a parameter value thereof;

6. a trigger stop parameter (TriggerStop), used for representing an action for stopping the display of the plurality of sub-materials, referring to what action is used to stop the display of the plurality of sub-materials, where a parameter value thereof may include trigger actions, and the user may select at least one action from a preset action set as the action for stopping the display of the plurality of sub-materials, that is, during the video playback, when the trigger action specified in the trigger stop parameter is detected, the display/playback of the corresponding plurality of sub-materials may be stopped, for example, for a case where when it is detected that the trigger action "opening mount" specified in the trigger action parameter appears in the video, the playback of the animation of throwing up rainbow formed of the plurality of sub-materials is started, the parameter value in the trigger stop parameter may be set as "closing mouth", and when it is detected the "closing mouth" action appears in the video, the rainbow disappears;

7. a display scale parameter (Scale), used for representing a reference basis for a change in a display size of the plurality of sub-materials, and used for achieving a display effect that the size of the plurality of sub-materials is large when the sub-materials are within a short distance and the size of the plurality of sub-materials is small when the sub-materials are within a long distance, where a reference value of the display scale parameter (i.e., the reference basis for the change in the display size of the plurality of sub-materials) may be two or more key points (which may be PointA and PointB) in preset key points, in this case, the display size of the plurality of sub-materials would change according to a change in a proportion of sizes formed by the two or more key points as the reference basis in the video, for example, when the plurality of sub-materials are glasses and a selected parameter value of the display scale parameter is a key point that represents a center of a pupil of a left eye and a key point that represents a center of a pupil of a right eye, in video playback, the display size of the plurality of sub-materials would change according to a change in a proportion of a length of a connecting line of the two key points, and if the parameter value of the display scale parameter is not changed, a default reference value thereof may be two key points on the reference part corresponding to the plurality of sub-materials;

8. a position type parameter (PositionType), used for representing a type of a relationship between each of the plurality of sub-materials and a respective position;

9. a position relation parameter (PositionRelationType), used for representing whether the plurality of sub-materials move with a preset reference part, referring to whether the plurality of sub-materials move with a position of the reference part, which may include two options, i.e., "(Yes, Move With Position)" and "No", where when "Yes" is selected as a parameter value, the plurality of sub-materials move with the position of the reference part, and if the reference value of the position type parameter is a foreground, "No" is selected as the parameter value, indicating that the plurality of sub-materials do not move with the position of the reference part;

10. a position parameter (Position), used for representing a position binding relationship between each of the plurality of sub-materials and a respective preset key point, referring to position relationships between the plurality of sub-materials and the preset key points during video playback, where the plurality of sub-materials may be selected for binding with positions of which key points in the preset key points; or 11. a rotation parameter (RotateCenter), used for representing a key point around which the plurality of sub-materials rotate, where a key point may be selected around which the plurality of sub-materials rotate during the video playback.

In one optional example, the trigger action corresponding to the trigger action parameter includes any one or more of the following:

trigger without an action (NULL), i.e., the plurality of sub-materials may be displayed without any action;

an eye action, such as blinking eyes, closing eyes, and opening eyes;

a heat action, such as shaking the head, nodding the head, tilting the head, and turning the head;

eyebrow action, such as raising eyebrows;

a hand action, such as loving-heart gesture, palm-up, palm, thumb-up, congratulations with hands folded, finger heart with one hand, OK gesture, peace gesture, pistol gesture, and an index finger;

a mouth action, such as opening the mouth and closing the mouth;

a shoulder action, such as shrugging shoulders; or another action.

Figure 4:
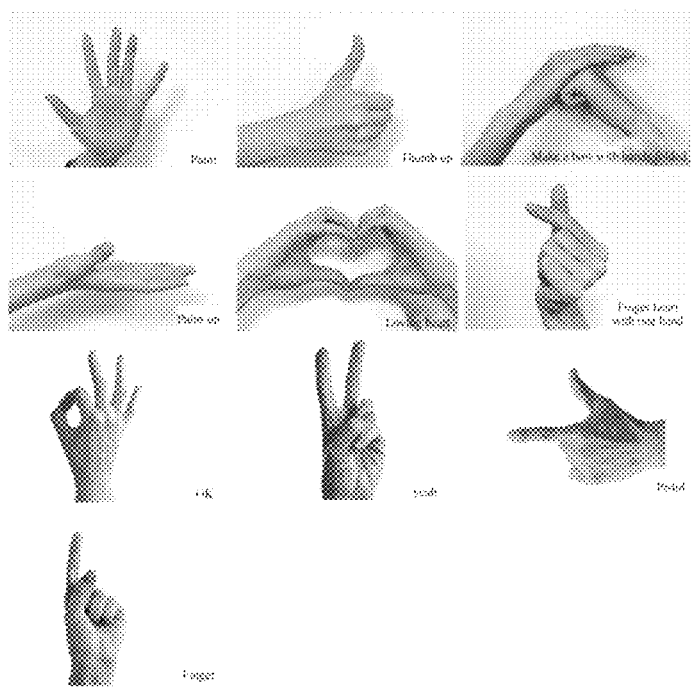
FIG. 4 is an exemplary schematic diagram of a hand action in embodiments of the present disclosure.

FIG. 4 shows an exemplary schematic diagram of a hand action in embodiments of the present disclosure.

In one optional example, a position type parameter, for example, includes any one of the following:

a parameter used for representing a foreground, in this case, indicating that corresponding plurality of sub-materials are displayed as the foreground in video playback, during the playback, the plurality of sub-materials would be related to a position of a screen of a display of a playback terminal, and a position of a center point thereof on the screen of the display maintains unchanged;

a parameter used for representing that the plurality of sub-materials are positioned and/or move with a position of a face, indicating that a reference part corresponding to the corresponding plurality of sub-materials is the face, and in this case, the plurality of sub-materials would be positioned and/or move with the position of the face during the video playback;

a parameter used for representing that the plurality of sub-materials are positioned and/or move with a position of a hand, indicating that the reference part corresponding to the corresponding plurality of sub-materials is a gesture (i.e., the face), and in this case, the plurality of sub-materials would be positioned and/or move with the position of the hand during the video playback;

a parameter used for representing that the plurality of sub-materials are positioned and/or move with a position of a head, used for indicating that the plurality of sub-materials would be positioned and/or move with the position of the head during the video playback;

a parameter used for representing that the plurality of sub-materials are positioned and/or move with a position of a shoulder, used for indicating that the plurality of sub-materials would move with the position of the shoulder during the video playback;

a parameter used for representing that the plurality of sub-materials are positioned and/or move with a position of an arm, used for indicating that the plurality of sub-materials would be positioned and/or move with the position of the arm during the video playback;

a parameter used for representing that the plurality of sub-materials are positioned and/or move with a position of a waist, used for indicating that the plurality of sub-materials would be positioned and/or move with the position of the waist during the video playback;

a parameter used for representing that the plurality of sub-materials are positioned and/or move with a position of a leg, used for indicating that the plurality of sub-materials would be positioned and/or move with the position of the leg during the video playback;

a parameter used for representing that the plurality of sub-materials are positioned and/or move with a position of a foot, used for indicating that the plurality of sub-materials would be positioned and/or move with the position of the foot during the video playback;

a parameter used for representing that the plurality of sub-materials are positioned and/or move with a position of a human skeleton, used for indicating that the plurality of sub-materials would be positioned and/or move with the position of the human skeleton during the video playback, a playback position relationship related to the reference part, which, for example, may include any one or more of the following position relationships: the plurality of sub-materials move with the position of the reference part (Position), and the plurality of sub-materials are scaled with a size of the reference part (Size); the plurality of sub-materials move with the position of the reference part (Position), the plurality of sub-materials are scaled with a size of the reference part (Size), and the plurality of sub-materials is scaled in depth with rotation of the reference part (Depth); and the plurality of sub-materials move with the position of the reference part (Position), the plurality of sub-materials are scaled with a size of the reference part (Size), the plurality of sub-materials are scaled in depth with rotation of the reference part (Depth), and the plurality of sub-materials rotate with rotation of a plane of the reference part; or a parameter used for representing a background, indicating that the corresponding plurality of sub-materials are displayed as the background during the video playback, during the video playback, the plurality of sub-materials would be related to the position of the screen of the display of the playback terminal, and a size of the plurality of sub-materials is adjusted, so that coordinates of four vertexes of the plurality of sub-materials are consistent with four vertexes of the screen of the display.

In one implementation of the embodiments of the present disclosure, the playback parameters further include a correspondence between a display position of the group of sub-materials and at least one predetermined key point.

The key point, for example, may include, but may be not limited to, any one or more of the following: a head key point, a face key point, a shoulder key point, an arm key point, a gesture key point, a waist key point, a leg key point, a foot key point, a human skeleton key point, or the like.

In one optional example, the head key point, for example, may include, but may be not limited to, any one or more of the following: a head top key point, a nose tip key point, a chin key point, or the like.

In one optional example, the face key point, for example, may include, but may be not limited to, any one or more of the following: a face contour key point, an eye key point, an eyebrow key point, a node key point, a mouth key point, or the like.

Exemplarily, the eye key point, for example, may include, but may be not limited to, any one or more of the following: a left eye contour key point, a left eye pupil center key point, a left eye center key point, a right eye contour key point, a right eye pupil center key point, a right eye center key point, or the like. The eyebrow key point, for example, may include, but may be not limited to, any one or more of the following: a left eyebrow key point, a right eyebrow key point, or the like. The nose key point, for example, may include, but may be not limited to, any one or more of the following: a nose bridge key point, a nose lower edge key point, a nose outside contour key point, or the like. The mouth key point, for example, may include, but may be not limited to, any one or more of the following: an upper lip key point, a lower lip key point, or the like.

In one optional example, the shoulder key point, for example, may include, but may be not limited to, any one or more of the following: a shoulder-head junction key point located at a junction position of the shoulder and the head, a shoulder contour midpoint key point located at a midpoint position between an arm root contour key point and the shoulder-head junction key point, or the like.

In one optional example, the arm key point, for example, may include, but may be not limited to, any one or more of the following: a wrist contour key point, an elbow contour key point, the arm root contour key point, a forearm contour midpoint key point located at a midpoint position of the wrist contour key point and the elbow contour key point, an upper arm midpoint key point at a midpoint position between the elbow contour key point and the arm root contour key point, or the like.

In one optional example, the gesture key point, for example, may include, but may be not limited to, any one or more of the following: four vertex key points of a gesture box (i.e., a gesture bounding box), center key points of the gesture box, or the like.

In one optional example, the leg key point, for example, may include, but may be not limited to, any one or more of the following: a crotch key point, a knee contour key point, an ankle contour key point, a thigh root outside contour key point, a calf contour midpoint key point located at a midpoint position between the knee contour key point and the ankle contour key point, a thigh inner contour midpoint key point located at a midpoint position between the knee inner contour key point and the crotch key point, a thigh outer contour midpoint key point located at a midpoint position between the knee outer contour key point and the thigh root outside contour key point, or the like.

In one optional example, the waist key point, for example, may include, but may be not limited to, any one or more of the following: N−1 equal division points generated by equally dividing a part between the thigh root outside contour key point and the arm root contour key point by N, where N is greater than 1.

In one optional example, the foot key point, for example, may include, but may be not limited to, any one or more of the following: a tiptoe key point, a heel key point, or the like.

In one optional example, the human skeleton key point, for example, may include, but may be not limited to, any one or more of the following: a right shoulder skeleton key point, a right elbow skeleton key point, a right wrist skeleton key point, a left shoulder skeleton key point, a left elbow skeleton key point, a left wrist skeleton key point, a right hip skeleton key point, a right knee skeleton key point, a right ankle skeleton key point, a left hip skeleton key point, a left knee skeleton key point, a left ankle skeleton key point, a head top skeleton key point, a neck skeleton key point, or the like.

In the embodiments of the present disclosure, positions of a plurality of key points may be preset, so as to make the display position of the plurality of sub-materials correspond to the positions of the key points. When the parameter values of the playback parameters of the plurality of sub-materials are set, key points may be selected directly from a preset key point set as the parameter values in corresponding playback parameters.

For example, in one implementation, a plurality of key points may be defined respectively for the face and the gesture (hand) based on face detection and gesture detection, so as to perform correspondence of positions based on face key points and gesture key points in generation of a special effect.

Figure 5:
FIG. 5 is an exemplary schematic diagram of face key points in embodiments of the present disclosure.

For example, FIG. 5 is an exemplary schematic diagram of face key points in the embodiments of the present disclosure. In combination with FIG. 5, in one optional example, the face key points may be defined as follows.

| Key point item | Key point serial number | Key point item | Key point serial number |
| --- | --- | --- | --- |
| Face box (face contour key point) | 0-32 | Nose bridge | 43-46 |
| Left eyebrow | 33-37, 64-67 | Right eyebrow | 38-42, 68-71 |

| Key point item | Key point serial number | Key point item | Key point serial number |
| --- | --- | --- | --- |
| Left eye contour | 52-57, 72-73 | Right eye contour | 58-63, 75-76 |
| Left eye pupil | 74, 104, | Right eye pupil | 77, 105 |
| Nose lower edge | 47-51 | Nose outside contour | 78-83 |
| Upper lip | 84-90, 96-100 | Lower lip | 91-95, 101-103 |

In one optional example, hand key points may be defined as follows.

| Key point item | Key point serial number | Key pointitem | Key point serial number |
| --- | --- | --- | --- |
| Gesture box | 110-113 | Center | 114 |

Key points with the serial numbers 110-113 are four vertexes of a gesture bounding box (i.e., a hand bounding box) respectively, a key point with the serial number 114 is a center of the gesture bounding box.

In addition, in the embodiments of the present disclosure, the method may further include: establishing a correspondence between a display position of a plurality of sub-materials and at least one predetermined key point; and/or establishing a correspondence between the display position of the plurality of sub-materials and a center key point of the bounding box.

For example, when key points in the correspondence established in the embodiments of the present disclosure are a head key point, a face key point, a shoulder key point, an arm key point, a waist key point, a leg key point, a foot key point, and a human skeleton key point, a correspondence between the display position of the plurality of sub-materials and at least one of the key points may be established; and when key points in the correspondence established in the embodiments of the present disclosure is a head key point, a face key point, a gesture key point, and a human skeleton key point, a correspondence between the display position of the plurality of sub-materials and a corresponding center key point of the bounding box (such as a head bounding box, a face bounding box, the gesture bounding box, or a human bounding box) are established.

In addition, still referring to FIG. 2, the apparatus for generating a special effect program file package according to the embodiments of the present disclosure may further include a content display bar. Accordingly, in another embodiment of the method for generating a special effect program file package of the present disclosure, the method may further include: displaying a reference image through a content display bar, and displaying key points on the reference image. The reference image includes at least one reference part. The reference part, for example, may include any one or more of the following: an ear, a hand, a face, hair, a neck, a shoulder, or the like.

Exemplarily, the reference image, for example, may be at least one part of an image of a reference person, for example, any one or more of the following images of the reference person: a complete image, a head image, a face image, a shoulder image, an arm image, a gesture image, a waist image, a leg image, a foot image, or the like.

In still another embodiment of the method for generating a special effect program file package of the present disclosure, after importing the plurality of sub-materials in the operation 102, the method may further include: displaying each sub-material in the group of imported sub-materials in sequence according to the parameter values of the playback parameters of the group of sub-materials, or displaying a plurality of sub-materials in the group of imported sub-materials simultaneously in the content display bar in accordance with a preset display policy; or receiving a selection operation on the sub-materials in the group of sub-materials, and displaying sub-materials selected according to the selection operation in the content display bar.

After the group of imported sub-materials are displayed on the content display bar, the user may change the display position of the group of sub-materials or one sub-material therein in the content display bar or adjust the display size thereof. Thus, in a further optional embodiment, the method may further include: updating the display position of the group of sub-materials in the content display bar according to a position movement operation on the group of sub-materials or one sub-material therein received through the content display bar, and updating corresponding parameter values in the playback parameters of the group of sub-materials; and/or the method may further include: updating the display size of the group of sub-materials in the content display bar according a size adjustment operation on the group of sub-materials or one sub-material therein received through the content display bar, and updating the corresponding parameter values in the playback parameters of the group of sub-materials.

For example, the user may select the group of sub-materials or one sub-material displayed in the content display bar through a mouse, and move the mouse to a small box at a lower right corner of the selected sub-material, and scale the selected sub-material by moving the small box, so as to adjust the display size of the selected sub-material; and the user may select the group of sub-materials or one sub-material displayed in the content display bar through the mouse and move the position thereof directly, so as to move the selected sub-material to a correct or desired position. In subsequent playback of the special effect program file package of the plurality of sub-materials, the position and display proportion of the plurality of sub-materials on the playback terminal would be consistent with the position and display proportion in the content display bar. Based on any one of the foregoing embodiments of the present disclosure, the user may add a special effect to a plurality of reference parts, for example, the ear, the face, and the hand may be respectively used as target parts where the special effect currently needs to be added, so as to execute any one of the foregoing embodiments, thereby achieving a special effect on the group of sub-materials of the ear, the face, and the hand.

When the user imports two or more groups of sub-materials, display layers of the groups of sub-materials (i.e., an occlusion relationship) may be adjusted. Thus, in still another embodiment of the method for generating a special effect program file package of the present disclosure, the method may further include: adjusting the occlusion relationship between the two or more groups of sub-materials according to a layer parameter adjustment instruction sent for the two or more groups of sub-materials and received through the interactive interface of the action bar, and displaying the two or more groups of sub-materials in the content display bar according to the adjusted occlusion relationship and the parameter values of the playback parameters.

In addition, in yet embodiment of the method for generating a special effect program file package of the present disclosure, before generating the special effect program file package, the method may further include:

generating a special effect program file of the group of sub-materials according to the preset special effect program file and the parameter values of the playback parameters of the group of sub-materials, and displaying the special effect program file of the group of sub-materials through a program file bar.

Exemplarily, the special effect program file, for example, may include, but may be not limited to, a special effect program file generated based on a json program or any other executable program.

In addition, in yet embodiment of the method for generating a special effect program file package of the present disclosure, the method further includes: starting the apparatus for generating a special effect program file package according to a received start instruction, and displaying the operation interface, where the operation interface includes an action bar, a content display bar, and a program file bar.

As shown in FIG. 2, in one optional example, the operation interface includes three regions at a left side, in a middle and at a right side of the operation interface. Accordingly, displaying the operation interface may include: displaying the action bar at the left side of the operation interface, displaying the content display bar in the middle of the operation interface, and displaying the program file bar at the right side of the operation interface.

The group of sub-materials may be imported through an interactive interface 20 in the action bar at the left side, the occlusion relationship between the layers of the multiple groups of sub-materials may be adjusted through an interactive interface 21, parameters of the layers of each group of sub-materials are set, and parameter values may be set for playback parameters of a group of sub-materials through an interactive interface 23; an average face is used as a reference face in the content display bar, all the group of imported sub-materials are displayed directly, and positions of the displayed sub-materials are moved through the mouse; the program file display bar at the right side is configured to display, through a display region 24 therein, content of a playback program file for the group of sub-materials for which the parameter values are set currently, and the special effect program file package may be imported through a save instruction interface 25 in the program file display bar, i.e., the special effect program file package is generated and saved.

Figure 6:
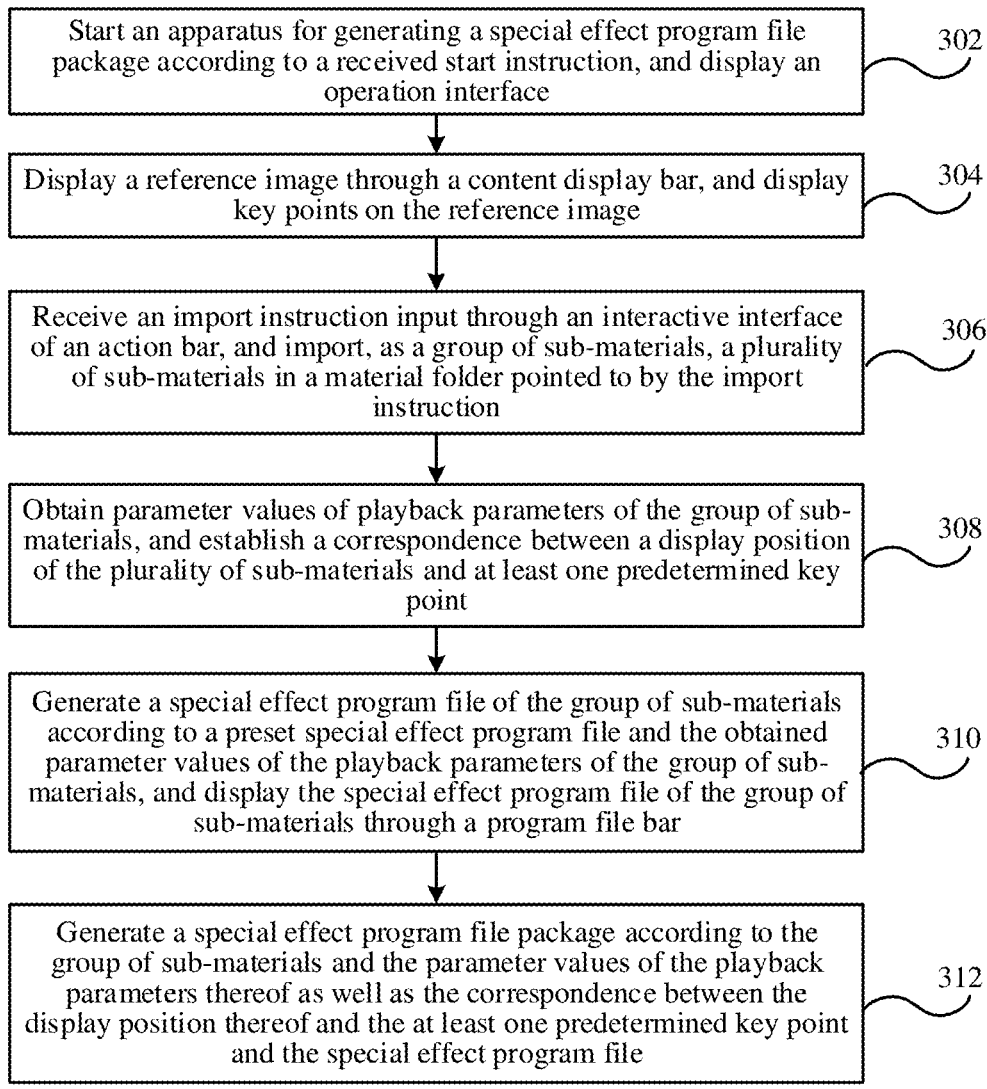
FIG. 6 is a flowchart of another embodiment of a method for generating a special effect program file package of the present disclosure.

FIG. 6 is a flowchart of another embodiment of a method for generating a special effect program file package of the present disclosure. As shown in FIG. 6, the method for generating a special effect program file package according to this embodiment includes the following steps.

At 302, an apparatus for generating a special effect program file package is started according to a received start instruction, and an operation interface is displayed.

The operation interface includes an action bar, a content display bar, and a program file bar.

At 304, a reference image is displayed through the content display bar, and key points on the reference image are displayed.

The reference image includes at least one reference part.

In an optional example, the operation 304 may be performed by a processor by invoking a corresponding instruction stored in a memory, or may be performed by the operation interface or the content display bar run by the processor.<

At 306, an import instruction input through an interactive interface of the action bar is received, and a plurality of sub-materials in a material folder pointed to by the import instruction as a group of sub-materials.

In an optional example, the operation 306 may be performed by a processor by invoking a corresponding instruction stored in a memory, or may be performed by a first import module run by the processor.

At 308, parameter values of playback parameters of the group of sub-materials are obtained, and a correspondence between a display position of the plurality of sub-materials and at least one predetermined key point.

In an optional example, the operation 308 may be performed by a processor by invoking a corresponding instruction stored in a memory, or may be performed by a first acquisition module run by the processor.

At 310, a special effect program file is generated according to a preset special effect program file and obtained parameter values of the playback parameters of the group of sub-materials, and the special effect program file of the group of sub-materials is displayed through the program file bar.

In an optional example, the operation 310 may be performed by a processor by invoking a corresponding instruction stored in a memory, or may be performed by the operation interface or the program file bar run by the processor.<

At 312, a special effect program file package is generated according to the group of sub-materials and the parameter values of the playback parameters thereof, as well as the correspondence between the display position thereof and the predetermined at least one key point and the special effect program file.

In an optional example, the operation 312 may be performed by a processor by invoking a corresponding instruction stored in a memory, or may be performed by a first generation module run by the processor.

In addition, after generating the special effect program file package based on any one of the foregoing embodiments of the present disclosure, the method may further include: saving, according to a received save instruction, the special effect program file package at a position pointed to by the save instruction.

In one implementation, saving, according to the received save instruction, the special effect program file package at the position pointed to by the save instruction may include:

in response to receipt of the save instruction, displaying a save path selection interface and a compression interface;

receiving a save position sent through the save path selection interface, receiving a compression mode sent based on the compression interface, and compressing the special effect program file package of the plurality of sub-materials in the compression mode to generate a compressed file package; and storing the compressed file package in a folder pointed to by the save position.

When a size of the special effect program file package is large, the special effect program file package is not suitable for running in a mobile phone terminal, and in embodiments of the present disclosure, the special effect program file package may be compressed and then saved, so that the special effect program file package may be imported to the mobile phone terminal so as to generate a special effect. In the embodiments of the present disclosure, only the special effect program file package is compressed, but a size of each sub-material in the special effect program file package is not changed, i.e., the size of each sub-material in the special effect program file package is same as a size of the sub-material before being imported.

After the special effect program file package is generated based on the embodiments of the present disclosure, the special effect program file package may be imported to the terminal, so as to generate a dynamic special effect for a video played by the terminal.

Figure 7:
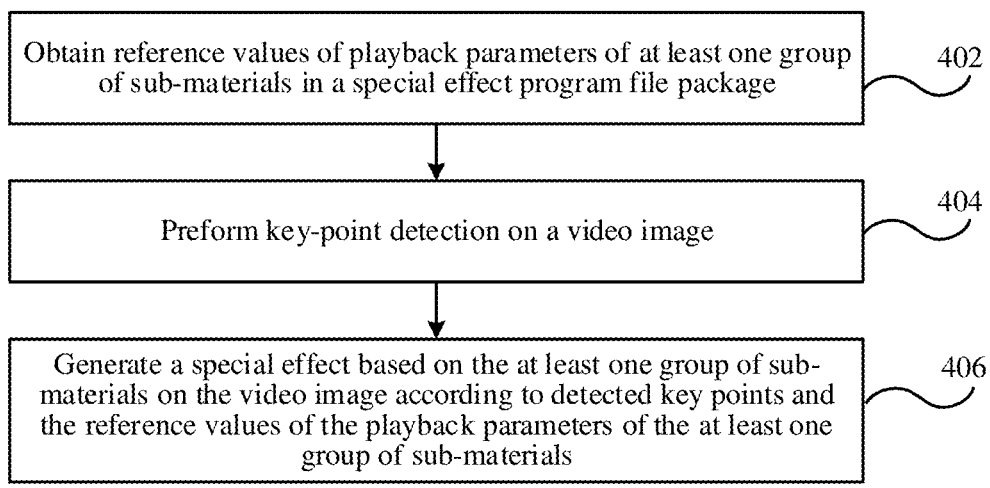
FIG. 7 is a flowchart of one embodiment of a method for generating a special effect of the present disclosure.

FIG. 7 is a flowchart of one embodiment of a method for generating a special effect of the present disclosure. As shown in FIG. 7, the method for generating a special effect according to this embodiment includes the following steps.

At 402, reference values of playback parameters of at least one group of sub-materials in a special effect program file package are obtained.

The group of sub-materials include a plurality of sub-materials. The plurality of sub-materials have a predetermined playback time sequence.

In an optional example, the operation 402 may be performed by a processor by invoking a corresponding instruction stored in a memory, or may be performed by a second acquisition module run by the processor.

At 404, key-point detection is performed on a video image.

In one implementation, key points involved in a correspondence may be detected on the video image through a neural network, and a key point detection result is output.

The key point detection result, for example, may include, but may be not limited to, any one or more of the following: positions of key points involved in the correspondence in the video image; or preset serial numbers of the key points involved in the correspondence in the special effect program file package.

In an optional example, the operation 404 may be performed by a processor by invoking a corresponding instruction stored in a memory, or may be performed by a first detection module run by the processor.

At 406, a special effect based on the at least one group of sub-materials is generated on the video image according to detected key points and the reference values of the playback parameters of the at least one group of sub-materials.

In an optional example, the operation 406 may be performed by a processor by invoking a corresponding instruction stored in a memory, or may be performed by a second generation module run by the processor.

Based on the method for generating a special effect provided in the foregoing embodiments of the present disclosure, reference values of playback parameters of at least one group of sub-materials in a special effect program file package are obtained, where the group of sub-materials include a plurality of sub-materials; key-point detection is performed on a video image; and a special effect based on the at least one group of sub-materials is generated on the video image according to detected key points and the reference values of the playback parameters of the at least one group of sub-materials. According to the embodiments of the present disclosure, a dynamic special effect is generated on a video based on reference values of playback parameters of at least one group of sub-materials in a pre-generated special effect program file package and key points in a video image, and dynamic special effect playback is implemented on the video, thereby improving a video playback effect.

In addition, in another embodiment of the method for generating a special effect of the present disclosure, the further may further include: importing the special effect program file package.

The special effect program file package may include the at least one group of sub-materials and the parameter values of the playback parameters of the at least one group of sub-materials, and the parameter values of the playback parameters of the group of sub-materials include a correspondence between a display position of the group of sub-materials and at least one predetermined key point.

In one implementation, importing the special effect program file package may include: reading the special effect program file package to a memory by invoking a first interface function for reading a sticker material; and parsing the special effect program file package to obtain the at least one group of sub-materials and a special effect program file, where the special effect program file includes the parameter values of the playback parameters of the at least one group of sub-materials.

In one optional example, the special effect program file may include a special effect program file of a json program or another executable program.

In one implementation, the special effect program file package in the embodiments of the method for generating a special effect of the present disclosure may be a special effect program file package generated according to any one of the foregoing embodiments of the method for generating a special effect program file package of the present disclosure.

In one implementation, the operation 402 may include: creating a sticker handle through a second interface function for creating a sticker handle; and reading the plurality of sub-materials and the parameter values of the playback parameters in the special effect program file package, and storing the at least one group of sub-materials and the parameter values of the playback parameters into the sticker handle.

In addition, in another embodiment of the method for generating a special effect of the present disclosure, the method may further include: determining a playback time sequence of the plurality of sub-materials according to file names of the plurality of sub-materials; obtaining a display position of each sub-material in the at least one group of sub-materials in the video and the number of video frames according to the parameter values of the playback parameters of the at least one group of sub-materials in the special effect program file in the sticker handle and the playback time sequence of the plurality of sub-materials, and pre-reading video images corresponding to the number of the video frames from the video.

Accordingly, in one implementation, the operation 406 includes: reading, from the sticker handle, the sub-materials that need to be displayed on a current video image of the video by invoking a third interface function for rendering the sticker material; determining, according to the detected key points and the parameter values of the playback parameters, a display position of to-be-displayed sub-materials on the current video image; and displaying, on the display position of the current video image, the sub-materials that need to be displayed on the current video image.

In one implementation, the method may further include: in response to completion of playback of the special effect program file package, destroying the sticker handle by invoking a fourth interface function for destroying the sticker handle.

Figure 8:
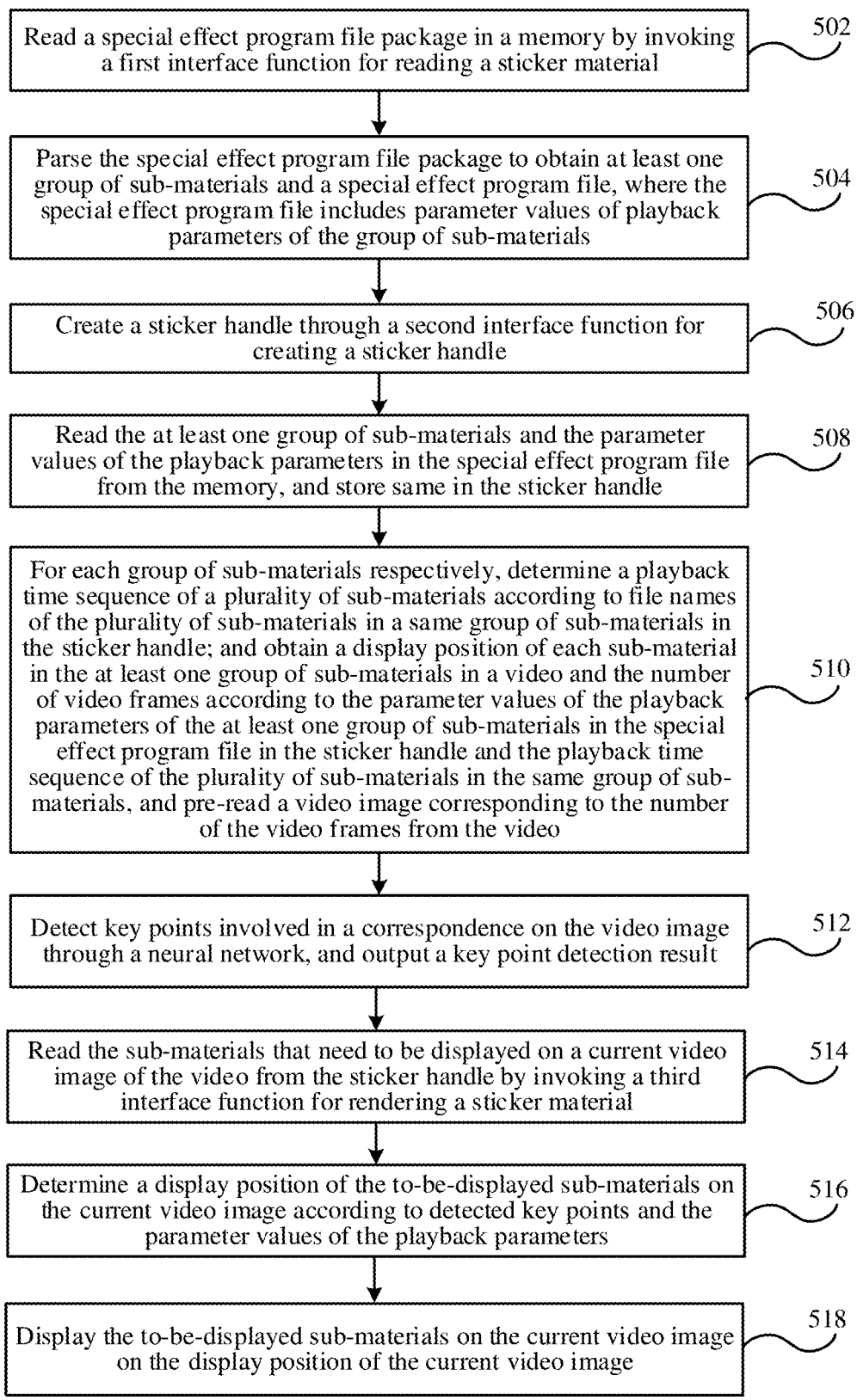
FIG. 8 is a flowchart of another embodiment of a method for generating a special effect of the present disclosure.

FIG. 8 is a flowchart of another embodiment of a method for generating a special effect of the present disclosure. As shown in FIG. 8, the method for generating a special effect according to this embodiment includes the following steps.

At 502, a special effect program file package is read in a memory by invoking a first interface function for reading a sticker material.

At 504, the special effect program file package is parsed to obtain at least one group of sub-materials and a special effect program file, where the special effect program file includes parameter values of playback parameters of the group of sub-materials.

The parameter values of the playback parameters of the group of sub-materials include a correspondence between a display position of the group of sub-materials and at least one predetermined key point.

In one optional example, the special effect program file may include a special effect program file of a json program or another executable program.

In one implementation, the special effect program file package in embodiments of the method for generating a special effect of the present disclosure may be a special effect program file package generated according to any one of the embodiments of the method for generating a special effect program file package of the present disclosure.

In an optional example, the operations 502-504 may be performed by a processor by invoking a corresponding instruction stored in a memory, or may be performed by a second import module run by the processor.

At 506, a sticker handle is created through a second interface function for creating a sticker handle.

At 508, the at least one group of sub-materials and the parameter values of the playback parameters in the special effect program file are read from the memory, and are stored in the sticker handle.

In an optional example, the operations 506-508 may be performed by a processor by invoking a corresponding instruction stored in a memory, or may be performed by a second acquisition module run by the processor.

At 510, for each group of sub-materials respectively, a playback time sequence of a plurality of sub-materials is determined according to file names of the plurality of sub-materials in a same group of sub-materials in the sticker handle; and a display position of each sub-material in the at least one group of sub-materials in a video and the number of video frames are obtained according to the parameter values of the playback parameters of the at least one group of sub-materials in the special effect program file in the sticker handle and the playback time sequence of the plurality of sub-materials in the same group of sub-materials, and a video image corresponding to the number of the video frames is pre-read from the video.

In an optional example, the operation 510 may be performed by a processor by invoking a corresponding instruction stored in a memory, or may be performed by a third acquisition module run by the processor.

At 512, key points involved in the correspondence are detected on the video image through a neural network, and a key point detection result is output.

In an optional example, the operation 512 may be performed by a processor by invoking a corresponding instruction stored in a memory, or may be performed by a first detection module run by the processor.

At 514, the sub-materials that need to be displayed on a current video image of the video are read from the sticker handle by invoking a third interface function for rendering a sticker material.

At 516, a display position of the sub-materials that need to be displayed on the current video image is determined according to detected key points and the parameter values of the playback parameters.

At 518, the sub-materials that need to be displayed on the current video image are displayed on the display position of the current video image.

In an optional example, the operations 514-518 may be performed by a processor by invoking a corresponding instruction stored in a memory, or may be performed by a second generation module run by the processor.

The embodiments of the method for generating a special effect of the present disclosure may be applied to various video playback scenarios, for example, applied to a live video scenario including a person, a dynamic special effect is generated for a live video, and the at least one group of sub-materials in the special effect program file package are superposed on a corresponding part of the person for playback. The corresponding part, for example, may be an ear, a hand, a face, hair, a neck, a shoulder, or the like.

Any method for generating a special effect program file package and method for generating a special effect provided in the embodiments of the present disclosure may be executed by any appropriate device having data processing capability, including, but not limited to, a terminal device, a server, or the like. Alternatively, any method for generating a special effect program file package and method for generating a special effect provided in the embodiments of the present disclosure may be executed by a processor, for example, the processor executes any method for generating a special effect program file package and method for generating a special effect mentioned in the embodiments of the present disclosure by invoking corresponding instructions stored in a memory. Details are not described below repeatedly.

A person of ordinary skill in the art may understand that all or some of steps for implementing the foregoing method embodiments are achieved by a program by instructing related hardware; the foregoing program may be stored in a computer-readable storage medium; when the program is executed, steps including the foregoing method embodiments are executed. Moreover, the foregoing storage medium includes various media capable of storing a program code such as an ROM, an RAM, a magnetic disk, or an optical disk.

Figure 9:
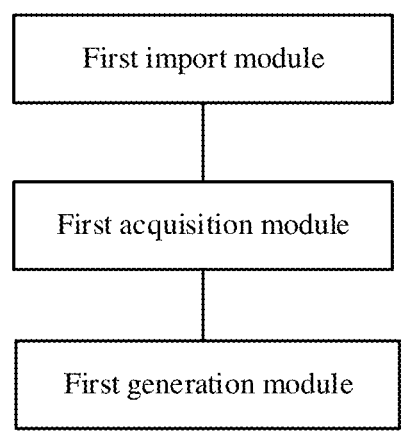
FIG. 9 is a schematic structural diagram of one embodiment of an apparatus for generating a special effect program file package of the present disclosure.

FIG. 9 is a schematic structural diagram of one embodiment of an apparatus for generating a special effect program file package of the present disclosure. The apparatus for generating a special effect program file package may be configured to implement embodiments of the method for generating a special effect program file package. As shown in FIG. 9, the apparatus for generating a special effect program file package according to this embodiment includes: a first import module, a first acquisition module, and a first generation module.

the first import module is configured to import a group of sub-materials, where the group of sub-materials include a plurality of sub-materials.

In one implementation of the embodiments of the present disclosure, the plurality of sub-materials in the group of sub-materials have a predetermined playback time sequence, where the playback time sequence of the plurality of sub-materials may be determined based on file names of the plurality of sub-materials.

The first acquisition module is configured to obtain parameter values of playback parameters of the group of sub-materials.

The first generation module is configured to generate a special effect program file package according to the group of sub-materials and the parameter values of the playback parameters.

In the embodiments of the present disclosure, the special effect program file package may include a group of sub-materials or multiple groups of sub-materials.

Based on the apparatus for generating a special effect program file package provided in the foregoing embodiments of the present disclosure, a group of sub-materials are imported, where the group of sub-materials include a plurality of sub-materials, parameter values of playback parameters of the group of sub-materials are obtained, and a special effect program file package is generated according to the group of sub-materials and the parameter values of the playback parameters, so as to perform dynamic special effect processing on a video based on the special effect program file package, thereby achieving a dynamic special effect on a played video. According to the embodiments of the present disclosure, a special effect program file executable by a rendering engine may be generated, without manually writing a program file, and the operation is simple and requires less time, thereby improving the overall efficiency of achieving the dynamic special effect, and effectively guaranteeing the accuracy of the special effect.

Figure 10:
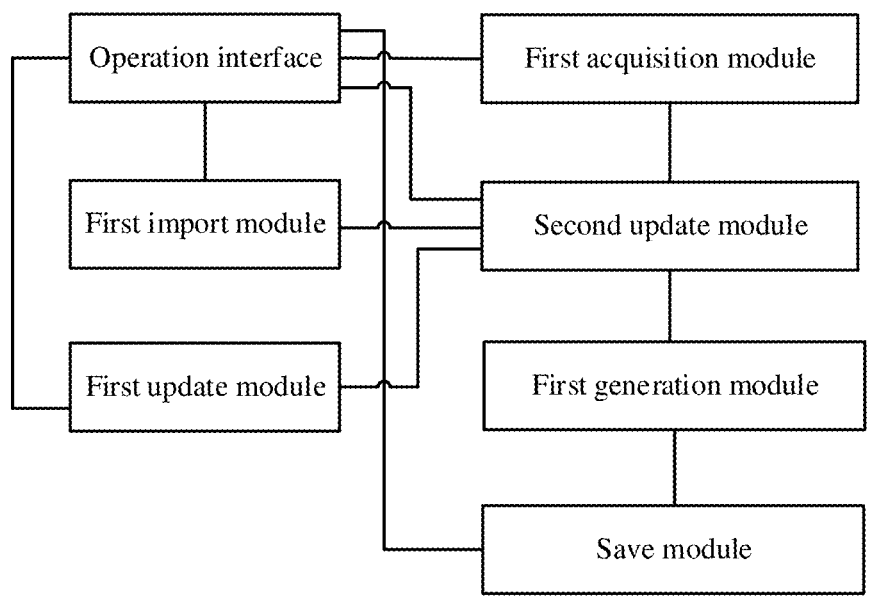
FIG. 10 is a schematic structural diagram of another embodiment of an apparatus for generating a special effect program file package of the present disclosure.

FIG. 10 is a schematic structural diagram of another embodiment of an apparatus for generating a special effect program file package of the present disclosure. As shown in FIG. 10, compared with an embodiment shown in FIG. 9, the generation apparatus according to this embodiment further includes an operation interface which includes an action bar. FIG. 2 is an exemplary diagram of the operation interface. Accordingly, in this embodiment, a first import module is configured to receive an import instruction input through an interactive interface of the action bar, and import a plurality of sub-materials in a material folder pointed to by the import instruction as a group of sub-materials.

In one implementation, the first import module is configured to: receive an import instruction sent via the interactive interface in a playback parameter setting interface under the action bar, and import the plurality of sub-materials in the material folder pointed to by the import instruction; or receive a selection instruction sent via the interactive interface of the action bar, use a reference part selected according to the selection instruction as a target part where a special effect currently needs to be added, and display a playback parameter setting interface for the target part in the action bar, receive the import instruction sent via the interactive interface in the playback parameter setting interface, and import the plurality of sub-materials in the material folder pointed to by the import instruction.

In one optional example, the first import module is configured to: receive the import instruction sent via the interactive interface, and import and display the material folder pointed to by the import instruction; in response to receipt of a selection operation on the sub-materials in the material folder, import a plurality of sub-materials selected according to the sub-material selection operation; and/or in response to non-receipt of the selection operation on the sub-materials in the material folder, selecting all or some of the sub-materials in the material folder according to a presetting, and importing the sub-materials selected according to the presetting.

In one optional example, when importing the plurality of sub-materials in the material folder pointed to by the import instruction, the first import module is configured to: in response to the import instruction including a display order of the plurality of sub-materials in the material folder pointed to by the import instruction, read and import the plurality of sub-materials in the display order, and display file names of a plurality of imported sub-materials in the action bar in the display order; and/or in response to the import instruction not including the display order of the plurality of sub-materials in the material folder pointed to by the import instruction, read and import the plurality of sub-materials in a preset order, and display the file names of the plurality of imported sub-materials in the action bar in the preset order.

In one implementation, a first acquisition module is configured to: in response to receipt of parameter values set for playback parameters of the group of sub-materials sent via the interactive interface in the playback parameter setting interface, use the set parameter values as the parameter values of the playback parameters of the group of sub-materials; and/or in response to non-receipt of the parameter values set for the playback parameters of the group of sub-materials sent via the interactive interface in the playback parameter setting interface, use preset parameter values as the parameter values of the playback parameters of the group of sub-materials.

In one implementation, the playback parameters may further include a correspondence between a display position of the group of sub-materials and at least one predetermined key point.

In one implementation, the first acquisition module may further be configured to establish the correspondence between the display position of the group of sub-materials and the at least one predetermined key point; and/or establish a correspondence between the display position of the group of sub-materials and a center key point of a bounding box.

In addition, in another implementation, the operation interface may further include a content display bar configured to display a reference image and display key points on the reference image, where the reference image includes at least one reference part. FIG. 2 is an exemplary diagram of the operation interface.

Exemplarily, the reference image, for example, may be at least one part of an image of a reference person, for example, any one or more of the following images of the reference person: a complete image, a head image, a face image, a shoulder image, an arm image, a gesture image, a waist image, a leg image, a foot image, or the like.

In still another embodiment of the generation apparatus according to the present disclosure, the content display bar may further be configured to: display each sub-material in the group of imported sub-materials in sequence according to the parameter values of the playback parameters of the group of sub-materials, or display a plurality of sub-materials in the group of imported sub-materials simultaneously in the content display bar in accordance with a preset display policy; or receive a selection operation on the sub-materials in the group of sub-materials, and display sub-materials selected according to the selection operation in the content display bar.

In addition, still referring to FIG. 10, the generation apparatus according to the embodiments of the present disclosure may further include: a first update module, configured to update the display position of the group of sub-materials in the content display bar according to a position movement operation on the group of sub-materials or one sub-material therein received through the content display bar, update the display position of the group of sub-materials in the content display bar, and update corresponding parameter values in the playback parameters of the group of sub-materials.

In addition, still referring to FIG. 10, the generation apparatus according to the embodiments of the present disclosure may further include: a second update module, configured to update a display size of the group of sub-materials in the content display bar according a size adjustment operation on the group of sub-materials or one sub-material therein received through the content display bar, and update the corresponding parameter values in the playback parameters of the group of sub-materials.

In addition, still referring to FIG. 10, the generation apparatus according to the embodiments of the present disclosure may further include: an adjustment module, configured to adjust an occlusion relationship between two or more groups of sub-materials according to a layer parameter adjustment instruction sent for the two or more groups of sub-materials and received through the interactive interface of the action bar, and display the two or more groups of sub-materials according to the adjusted occlusion relationship and the parameter values of the playback parameters.

In addition, the operation interface may further include: a program file bar, configured to generate a special effect program file of the group of sub-materials according to a preset special effect program file and the parameter values of the playback parameters of the group of sub-materials, and display the special effect program file of the group of sub-materials. The special effect program file, for example, may include, but may be not limited to, a special effect program file generated based on a json program.

Referring to FIG. 2, the operation interface may include three regions at a left side, in a middle and at a right side of the operation interface. The action bar is displayed at the left side of the operation interface, the content display bar is displayed in the middle of the operation interface, and the program file bar is displayed at the right side of the operation interface.

In addition, still referring to FIG. 10, the generation apparatus according to the embodiments of the present disclosure may further include: a save module, configured to save, according to a received save instruction, a special effect program file package at a position pointed to by the save instruction.

In one implementation, the save module is configured to: in response to receipt of the save instruction, display a save path selection interface and a compression interface; receive a save position sent through the save path selection interface, receive a compression mode sent based on the compression interface, and compress the special effect program file package of the sub-materials in the compression mode to generate a compressed file package; and store the compressed file package in a folder pointed to by the save position.

In one optional example, a size of each sub-material in the special effect program file package is same as a size of the sub-material before being imported.

In the embodiments of the present disclosure, the apparatus for generating a special effect may be configured to implement the foregoing embodiments of the method for generating a special effect, and may be, but may be not limited to, an AR engine or an electronic device having an AR special effect drawing function.

Figure 11:
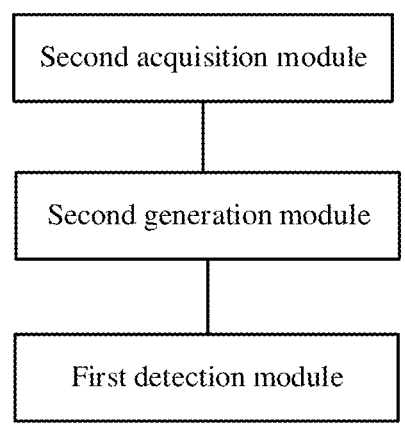
FIG. 11 is a schematic structural diagram of one embodiment of an apparatus for generating a special effect of the present disclosure.

FIG. 11 is a schematic structural diagram of one embodiment of an apparatus for generating a special effect of the present disclosure. As shown in FIG. 11, the apparatus for generating a special effect includes a second acquisition module, a first detection module, and a second generation module.

The second acquisition module is configured to obtain reference values of playback parameters of at least one group of sub-materials in a special effect program file package, where the group of sub-materials include a plurality of sub-materials.

In one implementation, the plurality of sub-materials have a predetermined playback time sequence.

In one implementation, the special effect program file package in embodiments of the apparatus for generating a special effect of the present disclosure may be a special effect program file package generated according to any one of the foregoing embodiments of the method or apparatus for generating a special effect program file package of the present disclosure.

The first detection module is configured to perform key-point detection on a video image.

The second generation module is configured to generate a special effect based on the at least one group of sub-materials on the video image according to detected key points and the reference values of the playback parameters of the at least one group of sub-materials.

Based on the apparatus for generating a special effect provided in the foregoing embodiments of the present disclosure, reference values of playback parameters of at least one group of sub-materials in a special effect program file package are obtained, where the group of sub-materials include a plurality of sub-materials; key-point detection is performed on a video image; and a special effect based on the at least one group of sub-materials is generated on the video image according to detected key points and the reference values of the playback parameters of the at least one group of sub-materials. According to the embodiments of the present disclosure, a dynamic special effect is generated on a video based on reference values of playback parameters of at least one group of sub-materials in a pre-generated special effect program file package and key points in a video image, and dynamic special effect playback is implemented on the video, thereby improving a video playback effect.

Figure 12:
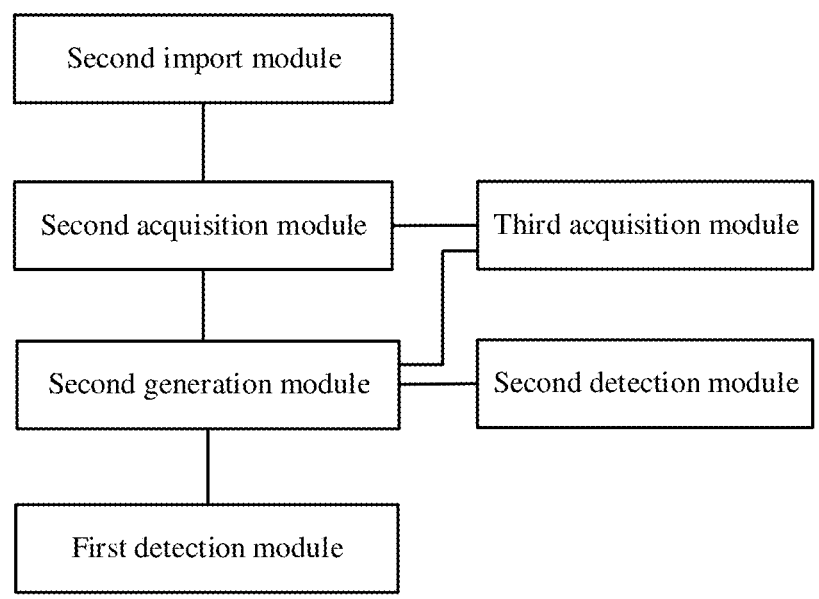
FIG. 12 is a schematic structural diagram of another embodiment of an apparatus for generating a special effect of the present disclosure.

FIG. 12 is a schematic structural diagram of another embodiment of an apparatus for generating a special effect of the present disclosure. As shown in FIG. 12, compared with an embodiment shown in FIG. 11, the generation apparatus according to this embodiment further includes: a second import module, configured to import a special effect program file package. The special effect program file package includes at least one group of sub-materials and parameter values of playback parameters of the at least one group of sub-materials, and the parameter values of the playback parameters of the group of sub-materials include a correspondence between a display position of the group of sub-materials and at least one predetermined key point.

In still another embodiment of the apparatus for generating a special effect of the present disclosure, the playback parameters include: a trigger event parameter, used for representing a trigger event for triggering display of a plurality of sub-materials. Accordingly, still referring to FIG. 12, the apparatus for generating a special effect according to this embodiment may further include: a second detection module, configured to detect whether a trigger action corresponding to a parameter value of the trigger action parameter occurs in a video image. Accordingly, in this embodiment, a second generation module is configured to: in response to detecting that the trigger action corresponding to the parameter value of the trigger action parameter occurs in the video image, generating a special effect based on the at least one group of sub-materials on a video according to detected key points and the parameter values of the playback parameters of the at least one group of sub-materials.

In yet another embodiment of the apparatus for generating a special effect of the present disclosure, the playback parameters further include: a trigger stop parameter, used for representing an action for stopping the display of the plurality of sub-materials. Accordingly, in this embodiment, the second detection module is further configured to detect whether a trigger action corresponding to a parameter value of the trigger stop parameter occurs in the video image. The second generation module is further configured to, in response to detecting that the trigger action corresponding to the parameter value of the trigger stop parameter occurs in the video image, stop the special effect of the at least one group of sub-materials generated on the video that is currently being played.

In still embodiment of the apparatus for generating a special effect of the present disclosure, the playback parameters further include: a beautifying/make-up effect parameter, used for representing a beautifying/make-up effect displayed at a preset part when the sub-materials are displayed. Accordingly, in this embodiment, the second generation module is further configured to display the beautifying/make-up effect at the preset part in the video image according to the beautifying/make-up effect parameter when generating the special effect of the at least one group of sub-materials on the video image according to the detected key points and the parameter values of the playback parameters of the at least one group of sub-materials.

In one implementation, the second import module is configured to: read the special effect program file package to a memory by invoking a first interface function for reading a sticker material; and parse a dynamic special effect program file package to obtain the at least one group of sub-materials and a special effect program file, where the special effect program file includes the parameter values of the playback parameters of the at least one group of sub-materials. The special effect program file, for example, may include a special effect program file generated based on a json program.

In one optional example, a second acquisition module is configured to: create a sticker handle through a second interface function for creating a sticker handle; and read the at least one group of sub-materials and the parameter values of the playback parameters of the at least one group of sub-materials in the special effect program file package, and store the at least one group of sub-materials and the parameter values of the playback parameters into the sticker handle.

In addition, still referring to FIG. 12, in yet another embodiment, the apparatus for generating a special effect may further include a determination module and a third acquisition module. The determination module is configured to determine a playback time sequence of the plurality of sub-materials according to file names of the plurality of sub-materials. The third acquisition module is configured to obtain a display position of each sub-material in the at least one group of sub-materials in the video and the number of video frames according to the parameter values of the playback parameters of the at least one group of sub-materials in the special effect program file in the sticker handle and the playback time sequence of the plurality of sub-materials, and pre-read video images corresponding to the number of the video frames from the video.

In one implementation, the second generation module is configured to: read, from the sticker handle, the sub-materials that need to be displayed on a current video image of the video by invoking a third interface function for rendering the sticker material; determine, according to the detected key points and the parameter values of the playback parameters, a display position of to-be-displayed sub-materials on the current video image; and display, on the display position of the current video image, the sub-materials that need to be displayed on the current video image.

In addition, still referring to FIG. 12, in still another embodiment of the apparatus for generating a special effect of the present disclosure, the second acquisition module is further configured to, in response to completion of playback of the special effect program file package, destroy the sticker handle by invoking a fourth interface function for destroying the sticker handle.

In one implementation of embodiments of the apparatus for generating a special effect of the present disclosure, a first detection module is configured to detect, through a neural network, key points involved in a correspondence on the video image, and output a key point detection result.

The key point detection result, for example, may include, but may be not limited to, any one or more of the following: a position of a key point involved in the correspondence in the video image; or a preset number of the key point involved in the correspondence.

In addition, another electronic device provided in the embodiments of the present disclosure includes:
a memory, configured to store a computer program; and
a processor, configured to execute the computer program stored in the memory, where when the computer program is executed, the method for generating a special effect program file package or the method for generating a special effect according to any one of the embodiments of the present disclosure is implemented.

Figure 13:
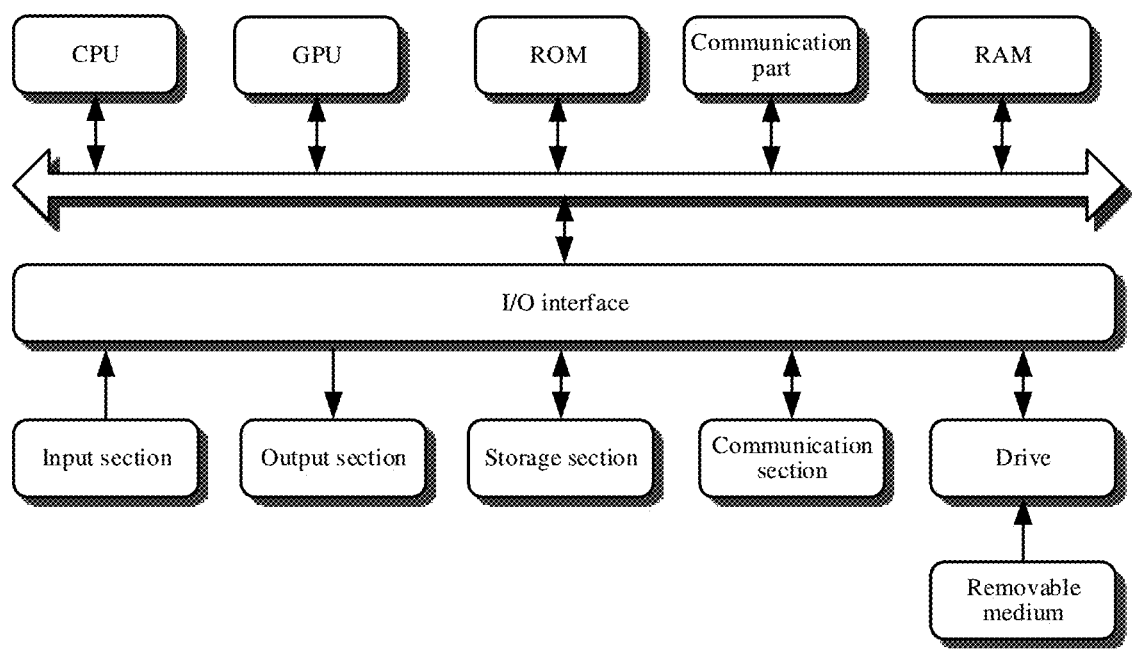
FIG. 13 is a schematic structural diagram of one application embodiment of an electronic device according to the present disclosure.

FIG. 13 is a schematic structural diagram of one application embodiment of an electronic device according to the present disclosure. Referring to FIG. 13 below, a schematic structural diagram of an electronic device suitable for implementing a terminal device or a server according to the embodiments of the present disclosure is shown. As shown in FIG. 13, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The communication part may include, but may be not limited to, a network card. The network card may include, but may be not limited to, an Infiniband (IB) network card. The processor may communicate with the ROM and/or the RAM to execute the executable instructions, is connected to the communication part via a bus, and communicates with other target devices via the communication part, so as to complete corresponding operations of any method provided in the embodiments of the present disclosure. For example, a group of sub-materials are imported, where the group of sub-materials include a plurality of sub-materials; parameter values of playback parameters of the group of sub-materials are obtained; and a special effect program file package is generated according to the group of sub-materials and the parameter values of the playback parameters. For another example, reference values of playback parameters of at least one group of sub-materials in a special effect program file package are obtained, where the group of sub-materials include a plurality of sub-materials; key-point detection is performed on a video image; and a special effect based on the at least one group of sub-materials on the video image according to detected key points and the reference values of the playback parameters of the at least one group of sub-materials.

In addition, the RAM may further store various programs and data required for operations of an apparatus. The CPU, the ROM, and the RAM are connected to each other via the bus. In the presence of the RAM, the ROM is an optional module. The RAM stores the executable instructions, or writes the executable instructions into the ROM during running, where the executable instructions cause the processor to perform corresponding operations of the method according to any one of the embodiment of the present disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse, and the like; an output section including a Cathode-Ray Tube (CRT), a Liquid Crystal Display (LCD), a speaker, and the like; the storage section including a hard disk and the like; and a communication section of a network interface card including an LAN card, a modem, and the like. The communication part performs communication processing via a network such as the Internet. A drive is also connected to the I/O interface according to requirements. A removable medium such as a magnetic disk, an optical disk, a magneto-optical disk, a semiconductor memory, or the like is mounted on the drive according to requirements, so that a computer program read from the removable medium may be installed on the storage section according to requirements.

It may be noted that the architecture shown in FIG. 13 is merely an optional implementation. During specific practice, a number and types of the components in FIG. 13 is selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of the present disclosure.

Particularly, a process described above with reference to the flowchart according to the embodiments of the present disclosure may be implemented as a computer software program. For example, the embodiments of the present disclosure include a computer program product, including a computer program tangibly included in a machine-readable medium, where the computer program includes a program code for performing a method shown in the flowchart, and the program code may include instructions for correspondingly performing steps of the face anti-counterfeiting detection method provided in the embodiments of the present disclosure. In such embodiments, the computer program is downloaded and installed from the network through the communication part, and/or is installed from the removable medium. When the computer program is executed by the CPU, the functions defined in the method according to the present disclosure are executed.

In addition, the embodiments of the present disclosure further provide a computer program, including computer instructions, where when the computer instructions run in a processor of a device, the method for generating a special effect program file package or the method for generating a special effect according to any one of the embodiments of the present disclosure is implemented.

In addition, the embodiments of the present disclosure further provide a computer-readable storage medium, having a computer program stored thereon, where when the computer program is executed by a processor, the method for generating a special effect program file package or the method for generating a special effect according to any one of the foregoing embodiments of the present disclosure is implemented.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for generating a special effect program file package, comprising: importing a group of sub-materials, wherein the group of sub-materials comprises a plurality of sub-materials; obtaining parameter values of playback parameters of the group of sub-materials; and generating the special effect program file package according to the group of sub-materials and the parameter values of the playback parameters, wherein the playback parameters of the group of sub-materials comprise the following: a display parameter, used for representing whether the plurality of sub-materials are displayed; an interval parameter, used for representing a number of frames spaced between two adjacent sub-materials in the plurality of sub-materials for display; a trigger action parameter, used for representing a trigger action for triggering display of the plurality of sub-materials; a loop parameter, used for representing a number of times of loop playback of the plurality of sub-materials; a trigger delay parameter, used for representing an amount of time for which a display of the plurality of sub-materials is delayed; a trigger stop parameter, used for representing an action for stopping the display of the plurality of sub-materials; a display scale parameter, used for representing a reference basis for a change in a display size of the plurality of sub-materials; a position type parameter, used for representing a type of a relationship between each of the plurality of sub-materials and a respective position; a position relation parameter, used for representing whether the plurality of sub-materials move with a preset reference part; a position parameter, used for representing a position binding relationship between each of the plurality of sub-materials and a respective preset key point; a rotation parameter, used for representing a key point around which the plurality of sub-materials rotate; and a beautifying/make-up effect parameter, used for representing a beautifying/make-up effect displayed at a preset part when the sub-materials are displayed.

2. The method according to claim 1, wherein the plurality of sub-materials have a predetermined playback time sequence,
wherein the predetermined playback time sequence of the plurality of sub-materials is determined based on file names of the plurality of sub-materials.

3. The method according to claim 1, wherein importing the group of sub-materials comprises: receiving an import instruction input through an interactive interface of an action bar, and importing, as the group of sub-materials, a plurality of sub-materials in a material folder pointed to by the import instruction.

4. The method according to claim 3, wherein receiving the import instruction input through the interactive interface of the action bar, and importing the plurality of sub-materials in the material folder pointed to by the import instruction comprise: receiving the import instruction sent via the interactive interface in a playback parameter setting interface under the action bar, and importing the plurality of sub-materials in the material folder pointed to by the import instruction; or, receiving a selection instruction sent via the interactive interface of the action bar, using a reference part selected according to the selection instruction as a target part where a special effect currently needs to be added, displaying a playback parameter setting interface for the target part in the action bar, receiving the import instruction sent via the interactive interface in the playback parameter setting interface, and importing the plurality of sub-materials in the material folder pointed to by the import instruction.

5. The method according to claim 3, wherein receiving the import instruction input through the interactive interface of the action bar, and importing the plurality of sub-materials in the material folder pointed to by the import instruction comprise:
receiving the import instruction sent via the interactive interface, and obtaining and displaying the material folder pointed to by the import instruction;
in response to receipt of a selection operation on the sub-materials in the material folder, importing a plurality of sub-materials selected according to the selection operation; and/or in response to non-receipt of the selection operation on the sub-materials in the material folder, selecting all or some of the sub-materials in the material folder according to a presetting, and importing the sub-materials selected according to the presetting.

6. The method according to claim 3, wherein importing the plurality of sub-materials in the material folder pointed to by the import instruction comprises: in response to the import instruction comprising a display order of the plurality of sub-materials in the material folder pointed to by the import instruction, reading and importing the plurality of sub-materials in the display order, and displaying file names of a plurality of imported sub-materials in the action bar in the display order; and/or in response to the import instruction not comprising the display order of the plurality of sub-materials in the material folder pointed to by the import instruction, reading and importing the plurality of sub-materials in a preset order, and displaying the file names of the plurality of imported sub-materials in the action bar in the preset order.

7. The method according to claim 4, wherein obtaining the parameter values of the playback parameters of the group of sub-materials comprises: in response to receipt of the parameter values set for the playback parameters of the group of sub-materials sent via the interactive interface in the playback parameter setting interface, using the set parameter values as the parameter values of the playback parameters of the group of sub-materials; and/or in response to non-receipt of the parameter values set for the playback parameters of the group of sub-materials sent via the interactive interface in the playback parameter setting interface, using preset parameter values as the parameter values of the playback parameters of the group of sub-materials.

8. The method according to claim 1,
wherein the trigger action corresponding to the trigger action parameter comprises any one or more of the following: trigger without an action, an eye action, a head action, an eyebrow action, a hand action, a mouth action, or a shoulder action,
wherein the position type parameter comprises any one of the following:
a parameter used for representing that the plurality of sub-materials are positioned and/or move with a position of a face;
a parameter used for representing that the plurality of sub-materials are positioned and/or move with a position of a hand;
a parameter used for representing that the plurality of sub-materials are positioned and/or move with a position of a head;
a parameter used for representing that the plurality of sub-materials are positioned and/or move with a position of a shoulder;
a parameter used for representing that the plurality of sub-materials are positioned and/or move with a position of an arm;
a parameter used for representing that the plurality of sub-materials are positioned and/or move with a position of a waist;
a parameter used for representing that the plurality of sub-materials are positioned and/or move with a position of a leg;
a parameter used for representing that the plurality of sub-materials are positioned and/or move with a position of a foot;
a parameter used for representing that the plurality of sub-materials are positioned and/or move with a position of a human skeleton;
a playback position relationship related to the preset reference part; or
a parameter used for representing a background, and
wherein the playback position relationship related to the preset reference part comprises any one or more of the following:
the plurality of sub-materials move with the position of the preset reference part, and the plurality of sub-materials are scaled with a size of the preset reference part;
the plurality of sub-materials move with the position of the preset reference part, the plurality of sub-materials are scaled with the size of the preset reference part, and the plurality of sub-materials are scaled in depth with rotation of the preset reference part; or the plurality of sub-materials move with the position of the preset reference part, the plurality of sub-materials are scaled with the size of the preset reference part, the plurality of sub-materials are scaled in depth with rotation of the preset reference part, and the plurality of sub-materials rotate with rotation of a plane of the preset reference part.

9. The method according to claim 1, wherein the playback parameters comprise a correspondence between a display position of the group of sub-materials and at least one predetermined key point; and
the at least one predetermined key point comprises any one or more of the following: a head key point, a face key point, a shoulder key point, an arm key point, a gesture key point, a waist key point, a leg key point, a foot key point, or a human skeleton key point.

10. The method according to claim 9, further comprising: establishing the correspondence between the display position of the group of sub-materials and the at least one predetermined key point; and/or establishing a correspondence between the display position of the group of sub-materials and a center key point of a bounding box.

11. The method according to claim 9, further comprising: displaying a reference image through a content display bar, and displaying key points on the reference image, wherein the reference image comprises at least one reference part,
wherein the reference image comprises at least one part of an image of a reference person,
wherein the at least one part of the image of the reference person comprises any one or more of the following images of the reference person: a complete image, a head image, a face image, a shoulder image, an arm image, a gesture image, a waist image, a leg image, or a foot image.

12. The method according to claim 11, after importing the plurality of sub-materials, further comprising: displaying each sub-material in the group of imported sub-materials in sequence according to the parameter values of the playback parameters of the group of sub-materials, or displaying a plurality of sub-materials in the group of imported sub-materials simultaneously in the content display bar in accordance with a preset display policy; or receiving a selection operation on the sub-materials in the group of sub-materials, and displaying sub-materials selected according to the selection operation in the content display bar.

13. The method according to claim 12, further comprising: updating the display position of the group of sub-materials in the content display bar according to a position movement operation on the group of sub-materials or one sub-material therein received through the content display bar, and updating corresponding parameter values in the playback parameters of the group of sub-materials.

14. The method according to claim 12, further comprising: updating the display size of the group of sub-materials in the content display bar according a size adjustment operation on the group of sub-materials or one sub-material therein received through the content display bar, and updating the corresponding parameter values in the playback parameters of the group of sub-materials.

15. The method according to claim 1, further comprising: adjusting an occlusion relationship between two or more groups of sub-materials according to a layer parameter adjustment instruction sent for the two or more groups of sub-materials and received through an interactive interface of an action bar, and displaying the two or more groups of sub-materials according to the adjusted occlusion relationship and the parameter values of the playback parameters.

16. The method according to claim 1, before generating the special effect program file package, further comprising: generating a special effect program file of the group of sub-materials according to a preset special effect program file and the parameter values of the playback parameters of the group of sub-materials, and displaying the special effect program file of the group of sub-materials through a program file bar.

17. A method for generating a special effect, comprising:
obtaining parameter values of playback parameters of at least one group of sub-materials in a special effect program file package, wherein the at least one group of sub-materials comprises a plurality of sub-materials;
performing key-point detection on a video image; and
generating a special effect based on the at least one group of sub-materials on the video image according to detected key points and the parameter values of the playback parameters of the at least one group of sub-materials,
the method further comprises: importing the special effect program file package,
wherein importing the special effect program file package comprises: reading the special effect program file package to a memory by invoking a first interface function for reading a sticker material; and parsing the special effect program file package to obtain the at least one group of sub-materials and a special effect program file, wherein the special effect program file comprises the parameter values of the playback parameters of the at least one group of sub-materials.

18. The method according to claim 17,
wherein the special effect program file package comprises the at least one group of sub-materials and the parameter values of the playback parameters of the at least one group of sub-materials, and the parameter values of the playback parameters of the at least one group of sub-materials comprise a correspondence between a display position of the at least one group of sub-materials and at least one predetermined key point,
wherein the special effect program file package is a special effect program file package generated by:
importing a group of sub-materials, wherein the group of sub-materials comprise a plurality of sub-materials;
obtaining parameter values of playback parameters of the group of sub-materials; and
generating the special effect program file package according to the group of sub-materials and the parameter values of the playback parameters.

19. The method according to claim 17, wherein the plurality of sub-materials have a predetermined playback time sequence,
wherein the playback parameters comprise: a trigger action parameter, used for representing a trigger action for triggering display of the plurality of sub-materials;
the method further comprises: detecting whether a trigger action corresponding to a parameter value of the trigger action parameter occurs in the video image,
wherein generating the special effect based on the at least one group of sub-materials on the video image according to detected key points and the parameter values of the playback parameters of the at least one group of sub-materials comprises: in response to detecting that the trigger action corresponding to the parameter value of the trigger action parameter occurs in the video image, generating the special effect of the at least one group of sub-materials on the video image according to the detected key points and the parameter values of the playback parameters of the at least one group of sub-materials.

20. The method according to claim 19, wherein the playback parameters further comprise: a trigger stop parameter, used for representing an action for stopping the display of the plurality of sub-materials; and the method further comprises: detecting whether a trigger action corresponding to a parameter value of the trigger stop parameter occurs in the video image; and in response to detecting that the trigger action corresponding to the parameter value of the trigger stop parameter occurs in the video image, stopping the special effect of the at least one group of sub-materials generated on the video image that is currently being played.

21. The method according to claim 19, wherein the playback parameters comprise: a beautifying/make-up effect parameter, used for representing a beautifying/make-up effect displayed at a preset part when the plurality of sub-materials are displayed; and the method further comprises: displaying the beautifying/make-up effect at the preset part in the video image according to the beautifying/make-up effect parameter when generating the special effect of the at least one group of sub-materials on the video image according to the detected key points and the parameter values of the playback parameters of the at least one group of sub-materials.

22. The method according to claim 17, wherein obtaining the parameter values of the playback parameters of the at least one group of sub-materials in the special effect program file package comprises: creating a sticker handle through a second interface function for creating a sticker handle; and reading the at least one group of sub-materials and the parameter values of the playback parameters of the at least one group of sub-materials in the special effect program file package, and storing the at least one group of sub-materials and the parameter values of the playback parameters into the sticker handle, wherein the method further comprises: determining a playback time sequence of the plurality of sub-materials according to file names of the plurality of sub-materials; obtaining a display position of each sub-material in the at least one group of sub-materials in the video image and a number of video frames according to the parameter values of the playback parameters of the at least one group of sub-materials in the special effect program file in the sticker handle and the playback time sequence of the plurality of sub-materials, and pre-reading video images corresponding to the number of video frames from the video image.

23. The method according to claim 22, wherein generating the special effect based on the at least one group of sub-materials on the video image according to detected key points and the parameter values of the playback parameters of the at least one group of sub-materials comprises: reading, from the sticker handle, the sub-materials that need to be displayed on a current video image of the video image by invoking a third interface function for rendering the sticker material; determining, according to the detected key points and the parameter values of the playback parameters, a display position of to-be-displayed sub-materials on the current video image; and displaying, on the display position of the current video image, the sub-materials that need to be displayed on the current video image.

24. The method according to claim 18, wherein performing the key-point detection on the video image comprises: detecting, through a neural network, key points involved in the correspondence on the video image, and outputting a key point detection result, wherein the key point detection result comprises any one or more of the following: positions of the key points involved in the correspondence in the video image; or preset serial numbers of the key points involved in the correspondence.

25. An electronic device, comprising: a memory storing processor-executable instructions; and a processor arranged to execute the stored processor-executable instructions to perform operations of: importing a group of sub-materials, wherein the group of sub-materials comprises a plurality of sub-materials, obtaining parameter values of playback parameters of the group of sub-materials, and generating a special effect program file package according to the group of sub-materials and the parameter values of the playback parameters; or, obtaining parameter values of playback parameters of at least one group of sub-materials in the special effect program file package, wherein the at least one group of sub-materials comprises a plurality of sub-materials, performing key-point detection on a video image, and generating a special effect based on the at least one group of sub-materials on the video image according to detected key points and the parameter values of the playback parameters of the at least one group of sub-materials, wherein the playback parameters of the group of sub-materials comprise the following: a display parameter, used for representing whether the plurality of sub-materials are displayed; an interval parameter, used for representing a number of frames spaced between two adjacent sub-materials in the plurality of sub-materials for display; a trigger action parameter, used for representing a trigger action for triggering display of the plurality of sub-materials; a loop parameter, used for representing a number of times of loop playback of the plurality of sub-materials; a trigger delay parameter, used for representing an amount of time for which a display of the plurality of sub-materials is delayed; a trigger stop parameter, used for representing an action for stopping the display of the plurality of sub-materials; a display scale parameter, used for representing a reference basis for a change in a display size of the plurality of sub-materials; a position type parameter, used for representing a type of a relationship between each of the plurality of sub-materials and a respective position; a position relation parameter, used for representing whether the plurality of sub-materials move with a preset reference part; a position parameter, used for representing a position binding relationship between each of the plurality of sub-materials and a respective preset key point; a rotation parameter, used for representing a key point around which the plurality of sub-materials rotate; and a beautifying/make-up effect parameter, used for representing a beautifying/make-up effect displayed at a preset part when the sub-materials are displayed.

* * * * *